US012475846B2

(12) United States Patent
Cheng et al.

(10) Patent No.: US 12,475,846 B2
(45) Date of Patent: Nov. 18, 2025

(54) TIMING CONTROLLER, DISPLAY DEVICE, AND PIXEL DRIVING METHOD

(71) Applicants: Chengdu BOE Optoelectronics Technology Co., Ltd., Sichuan (CN); BOE Technology Group Co., Ltd., Beijing (CN)

(72) Inventors: Tianyi Cheng, Beijing (CN); Yonglin Guo, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/689,505

(22) PCT Filed: Aug. 30, 2022

(86) PCT No.: PCT/CN2022/115799
§ 371 (c)(1),
(2) Date: Mar. 6, 2024

(87) PCT Pub. No.: WO2024/044958
PCT Pub. Date: Mar. 7, 2024

(65) Prior Publication Data
US 2024/0404470 A1 Dec. 5, 2024

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/043* (2013.01);
(Continued)

(58) Field of Classification Search
CPC ............... G09G 3/3233; G09G 3/3291; G09G 2300/043; G09G 2310/08; G09G 2320/0233; G09G 2320/0247
See application file for complete search history.

(56) References Cited

U.S. PATENT DOCUMENTS

2020/0394962 A1 12/2020 Seo et al.
2021/0134210 A1* 5/2021 In ......................... G09G 3/2092
(Continued)

FOREIGN PATENT DOCUMENTS

CN 112397026 A 2/2021
CN 112509519 A 3/2021
(Continued)

OTHER PUBLICATIONS

European Patent Office, Extended European Search Report, May 9, 2025, for corresponding EP application No. 22956790.4.

*Primary Examiner* — Matthew A Eason
*Assistant Examiner* — Scott D Au
(74) *Attorney, Agent, or Firm* — HOUTTEMAN LAW LLC

(57) ABSTRACT

The present disclosure provides a timing controller applied to a display device, where the display device includes a plurality of pixel circuits, a first driving circuit and a second driving circuit, each of the pixel circuits includes a driving transistor and a writing and compensation circuit; the first driving circuit is configured to sequentially output a first effective level signal to each of first control signal lines, according to a first driving start signal; the second driving circuit is configured to sequentially output a second effective level signal to each of second control signal lines, according to a second driving start signal; and the timing controller is configured to provide the first driving start signal and the second driving start signal during a refresh frame, where the
(Continued)

number W of effective pulses in the first driving start signal is more than or equal to 2.

19 Claims, 23 Drawing Sheets

(52) U.S. Cl.
CPC .................. *G09G 2310/08* (2013.01); *G09G 2320/0233* (2013.01); *G09G 2320/0247* (2013.01)

(56) References Cited

U.S. PATENT DOCUMENTS

| | | | | |
|---|---|---|---|---|
| 2021/0248958 | A1 | 8/2021 | Park et al. | |
| 2022/0028333 | A1 | 1/2022 | Jeong et al. | |
| 2022/0327993 | A1* | 10/2022 | Xiong | G09G 3/32 |
| 2024/0185791 | A1* | 6/2024 | Peng | G09G 3/3258 |

FOREIGN PATENT DOCUMENTS

| | | | |
|---|---|---|---|
| CN | 114222615 | A | 3/2022 |
| CN | 114258320 | A | 3/2022 |
| CN | 114758618 | A | 7/2022 |
| CN | 114783349 | A | 7/2022 |

* cited by examiner

TIMING CONTROLLER, DISPLAY DEVICE, AND PIXEL DRIVING METHOD

TECHNICAL FIELD

The present disclosure relates to the field of display technology, and in particular, to a timing controller, a display device, and a pixel driving method.

BACKGROUND

An Organic Light Emitting Diode (OLED) has the advantages of low power consumption, low cost, self-luminescence, wide viewing angle, and fast response speed, and becomes one of the research hotspots in the display field at present. An electronic product may display with different image refresh rates in different application scenes. For example, a driving mode with a higher image refresh rate (a shorter display period) is adopted to drive and display dynamic images (for example, a sports event or a game scene), to ensure fluency of the displayed image; and a driving mode with a lower image refresh rate (a longer display period) is adopted to drive and display slow motion images or a static image, to reduce the power consumption.

However, in practical applications, it has been found that a problem of flicker occurs when switching between different image refresh rates.

SUMMARY

The present disclosure is directed to solving at least one of the technical problems in the prior art, and provides a timing controller, a display device and a pixel driving method.

In a first aspect, an embodiment of the present disclosure provides a timing controller applied to a display device, where the display device includes a plurality of pixel circuits, a first driving circuit, and a second driving circuit, and each of the plurality of pixel circuits includes a driving transistor and a writing and compensation circuit;

- the writing and compensation circuit is connected to a first electrode, a second electrode and a gate electrode of the driving transistor, and is configured to write a non-display data voltage provided by a data line to the first electrode of the driving transistor, in response to control by a first effective level signal provided by a first control signal line, perform threshold compensation processing on the driving transistor and write a threshold-compensated display data voltage to the gate electrode of the driving transistor, in response to the control by the first effective level signal provided by the first control signal line and a second effective level signal provided by a second control signal line;
- the first driving circuit is connected to first control signal lines for the plurality of pixel circuits, and is configured to sequentially output the first effective level signal to each of the first control signal lines, according to a first driving start signal;
- the second driving circuit is connected to second control signal lines for the plurality of pixel circuits, and is configured to sequentially output the second effective level signal to each of the second control signal lines, according to a second driving start signal; and
- the timing controller is connected to the first driving circuit and the second driving circuit, and is configured to provide the first driving start signal to the first driving circuit and provide the second driving start signal to the second driving circuit during a refresh frame in a display period, a number of effective pulses in the first driving start signal is W, where W≥2, and W is an integer.

In some embodiments, during the refresh frame, a time segment corresponding to at least one of the effective pulses in the first driving start signal is within a time segment corresponding to an effective pulse in the second driving start signal, and a time segment corresponding to at least one of the effective pulses in the first driving start signal is outside the time segment corresponding to the effective pulse in the second driving start signal.

In some embodiments, the timing controller is specifically configured to provide the first driving start signal to the first driving circuit in each fixed frame in the display period, where the number of effective pulses in the first driving start signal in each fixed frame is W.

In some embodiments, the display period further includes at least one hold frame subsequent to the refresh frame; and

- during each of the at least one hold frame, the timing controller does not provide the second driving start signal to the second driving circuit.

In some embodiments, the second driving start signal includes one effective pulse during the refresh frame, a time segment corresponding to a 1st effective pulse in the first driving start signal is within the time segment corresponding to the effective pulse in the second driving start signal, and a time segment corresponding to other effective pulse except for the 1st effective pulse in the first driving start signal is outside the time segment corresponding to the effective pulse in the second driving start signal.

In some embodiments, a ratio of an effective pulse width of the effective pulse in the second driving start signal to an effective pulse width of the 1st effective pulse in the first driving start signal is in a range of 3:1 to 14:1.

In some embodiments, the display device further includes a third driving circuit;

- the pixel circuit further includes a light emitting control circuit and a light emitting element;
- the light emitting control circuit is connected to a first operating voltage supply terminal, the first electrode of the driving transistor, the second electrode of the driving transistor, and a first terminal of the light emitting element, and is configured to form a conductive path between the first operating voltage supply terminal and the first electrode of the driving transistor and form a conductive path between the second electrode of the driving transistor and the light emitting element, in response to control by a third effective level signal provided by a third control signal line;
- a second terminal of the light emitting element is connected to a second operating voltage supply terminal;
- the third driving circuit is connected to third control signal lines for the plurality of pixel circuits, and is configured to sequentially output the third effective level signal to each of the third control signal lines, according to a third driving start signal; and
- the timing controller is further configured to provide the third driving start signal to the third driving circuit in each fixed frame in the display period.

In some embodiments, the third driving start signal includes at least one effective pulse; and

- a time segment corresponding to each of the effective pulses in the first driving start signal does not overlap a time segment corresponding to each of the at least one effective pulse in the third driving start signal.

In some embodiments, during the refresh frame, the second driving start signal includes one effective pulse, and a time segment corresponding to other effective pulse except for a $1^{st}$ effective pulse in the first driving start signal is subsequent to the time segment corresponding to the effective pulse in the second driving start signal, and prior to a time segment corresponding to a $1^{st}$ effective pulse in the third driving start signal.

In some embodiments, the display period further includes at least one hold frame subsequent to the refresh frame; and during each of the at least one hold frame, the time segment corresponding to each of the effective pulses in the first driving start signal is prior to a time segment corresponding to a $1^{st}$ effective pulse in the third driving start signal.

In some embodiments, 2≤W≤6.

In some embodiments, effective pulse widths of the effective pulses in the first driving start signal are equal to each other.

In some embodiments, a sum of effective pulse widths of all the effective pulses in the first driving start signal is equal, throughout respective fixed frames in the display period.

In some embodiments, a waveform of the first driving start signal is the same, throughout respective fixed frames in the display period.

In some embodiments, each of the effective pulses in the first driving start signal is a low level pulse; and the effective pulse in the second driving start signal is a high level pulse.

In a second aspect, an embodiment of the present disclosure provides a display device, including the timing controller as provided in the above first aspect.

In some embodiments, the display device further includes a display panel including a plurality of pixel circuits, and each of the plurality of pixel circuits includes a driving transistor, a writing and compensation circuit, a light emitting control circuit, and a light emitting element;

the writing and compensation circuit is connected to a first electrode, a second electrode and a gate electrode of the driving transistor, and is configured to write the non-display data voltage provided by a data line to the first electrode of the driving transistor, in response to control by a first effective level signal provided by a first control signal line, and perform threshold compensation processing on the driving transistor and write a threshold-compensated display data voltage to the gate electrode of the driving transistor, in response to control by the first effective level signal provided by the first control signal line and a second effective level signal provided by a second control signal line;

the light emitting control circuit is connected to a first operating voltage supply terminal, the first electrode of the driving transistor, the second electrode of the driving transistor, and a first terminal of the light emitting element, and is configured to form a conductive path between the first operating voltage supply terminal and the first electrode of the driving transistor and form a conductive path between the second electrode of the driving transistor and the light emitting element, in response to control by a third effective level signal provided by a third control signal line; and a second terminal of the light emitting element is connected to a second operating voltage supply terminal.

In some embodiments, the writing and compensation circuit includes a first transistor and a second transistor;

a control electrode of the first transistor is connected to the first control signal line, a first electrode of the first transistor is connected to the data line, and a second electrode of the first transistor is connected to the first electrode of the driving transistor; and a control electrode of the second transistor is connected to the second control signal line, a first electrode of the second transistor is connected to the gate electrode of the driving transistor, and a second electrode of the second transistor is connected to the second electrode of the driving transistor.

In some embodiments, the pixel circuit further includes a fifth transistor; and a control electrode of the fifth transistor is connected to a fourth control signal line, a first electrode of the fifth transistor is connected to the gate electrode of the driving transistor, and a second electrode of the fifth transistor is connected to a first reset voltage supply terminal.

In some embodiments, the plurality of pixel circuits are arranged in an array in a row direction and a column direction, and each row of pixel circuits is provided with a corresponding one of the second control signal lines; and the fourth control signal line connected to the pixel circuit is the second control signal line for a previous row of pixel circuits.

In some embodiments, the pixel circuit further includes a fifth transistor; and a control electrode of the fifth transistor is connected to a fourth control signal line, a first electrode of the fifth transistor is connected to the second electrode of the driving transistor, and a second electrode of the fifth transistor is connected to a first reset voltage supply terminal.

In some embodiments, the plurality of the pixel circuits are arranged in an array in a row direction and a column direction, and each row of pixel circuits is provided with a corresponding one of the first control signal lines; and the fourth control signal line connected to the pixel circuit is the first control signal line for a previous row of pixel circuits.

In some embodiments, the writing and compensation circuit includes a first transistor, a second transistor, and an eighth transistor;

a control electrode of the first transistor is connected to the first control signal line, a first electrode of the first transistor is connected to the data line, and a second electrode of the first transistor is connected to the first electrode of the driving transistor;

a control electrode of the second transistor is connected to the second control signal line, a first electrode of the second transistor is connected to the gate electrode of the driving transistor, and a second electrode of the second transistor is connected to a first electrode of the eighth transistor; and a control electrode of the eighth transistor is connected to the first control signal line, and a second electrode of the eighth transistor is connected to the second electrode of the driving transistor.

In some embodiments, the pixel circuit further includes a fifth transistor; and a control electrode of the fifth transistor is connected to a fourth control signal line, a first electrode of the fifth transistor is connected to the second electrode of the second transistor and the first electrode of the eighth transistor, and a second electrode of the fifth transistor is connected to a first reset voltage supply terminal.

In some embodiments, the plurality of the pixel circuits are arranged in an array in a row direction and a column direction, and each row of pixel circuits is provided with a corresponding one of the first control signal lines; and the fourth control signal line connected to the pixel circuit is the first control signal line for a previous row of pixel circuits.

In some embodiments, the light emitting control circuit includes a third transistor and a fourth transistor;

a control electrode of the third transistor is connected to the third control signal line, a first electrode of the third transistor is connected to the first operating voltage supply terminal, and a second electrode of the third transistor is connected to the first electrode of the driving transistor; and a control electrode of the fourth transistor is connected to the third control signal line, a first electrode of the fourth transistor is connected to the second electrode of the driving transistor, and a second electrode of the fourth transistor is connected to the first terminal of the light emitting element.

In some embodiments, the pixel circuit further includes a sixth transistor; and a control electrode of the sixth transistor is connected to a fifth control signal line, a first electrode of the sixth transistor is connected to a second reset voltage supply terminal, and a second electrode of the sixth transistor is connected to the first terminal of the light emitting element.

In some embodiments, the pixel circuit further includes a seventh transistor; and a control electrode of the seventh transistor is connected to a fifth control signal line, a first electrode of the seventh transistor is connected to a third reset voltage supply terminal, and a second electrode of the seventh transistor is connected to the first electrode of the driving transistor.

In some embodiments, the plurality of the pixel circuits are arranged in an array in a row direction and a column direction, and each row of the pixel circuits is provided with a corresponding one of the first control signal lines; and the fifth control signal line connected to the pixel circuit is the first control signal line for a previous row of pixel circuits.

In a third aspect, an embodiment of the present disclosure further provides a pixel driving method applied to a pixel circuit, where the pixel circuit includes a driving transistor and a writing and compensation circuit;

the writing and compensation circuit is connected to a first electrode, a second electrode and a gate electrode of the driving transistor, and is configured to write a non-display data voltage provided by a data line to the first electrode of the driving transistor, in response to control by a first effective level signal provided by a first control signal line, and perform threshold compensation processing on the driving transistor and write a threshold-compensated display data voltage to the gate electrode of the driving transistor, in response to control by the first effective level signal provided by the first control signal line and a second effective level signal provided by a second control signal line;

the driving method includes:

during a refresh frame, by the writing and compensation circuit, performing the threshold compensation processing on the driving transistor and writing the threshold-compensated display data voltage to the gate electrode of the driving transistor, in response to the control by the first effective level signal and the second effective level signal; and writing the non-display data voltage provided by the data line to the first electrode of the driving transistor, for $W-1$ times, in response to the control by the first effective level signal;

where $W \geq 2$ and W is an integer.

In some embodiments, the driving method further includes:

during a hold frame, the writing and compensation circuit, writing the non-display data voltage provided by the data line to the first electrode of the driving transistor, for W times, in response to the control by the first effective level signal;

where $W \geq 2$ and W is an integer.

DETAIL DESCRIPTION OF EMBODIMENTS

Figure 1:
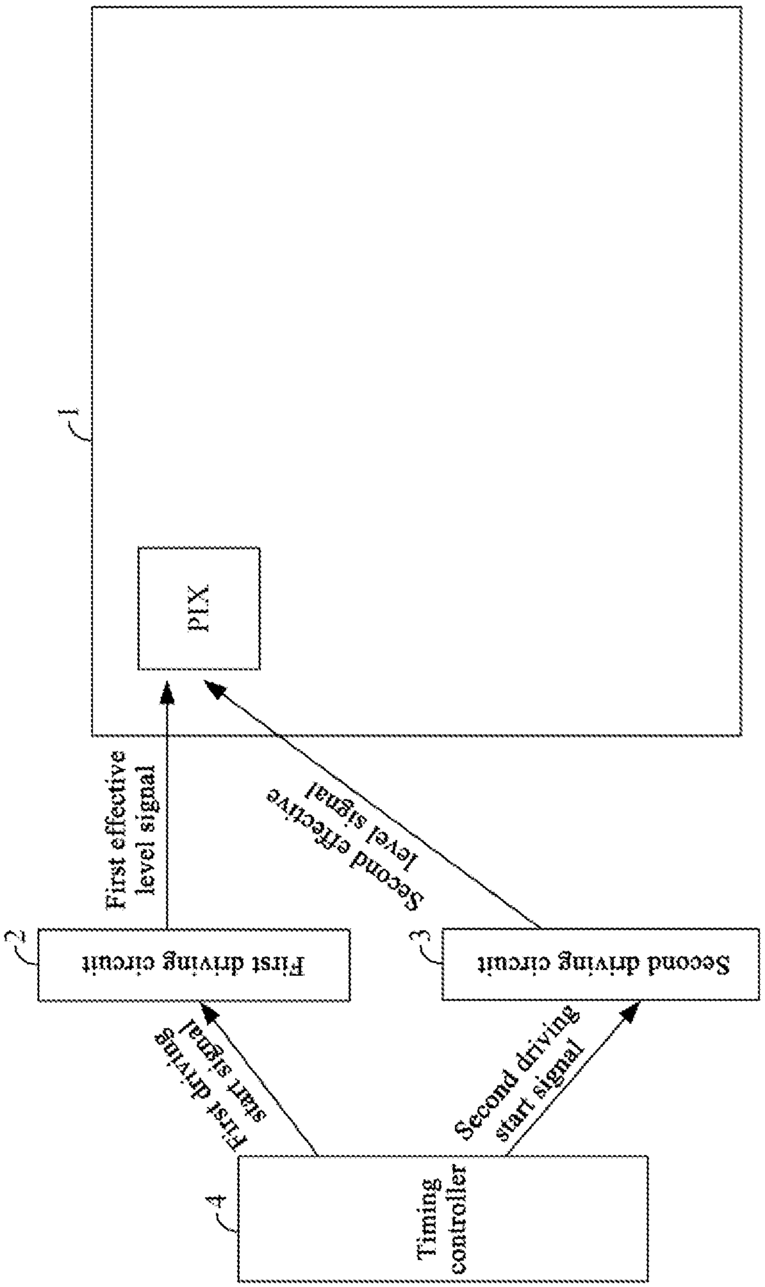
FIG. 1 is a schematic diagram illustrating a structure of a display device according to an embodiment of the present disclosure.

In order to make the objects, technical solutions and advantages of the embodiments of the present disclosure more apparent, the technical solutions of the embodiments of the present disclosure will be clearly and completely described below with reference to the drawings of the embodiments of the present disclosure. Obviously, the described embodiments are some, but not all, embodiments of the present disclosure. Furthermore, the embodiments and features of the embodiments in the present disclosure may be combined with each other in case of no conflict. All other embodiments, which can be derived by one of ordinary skill in the art from the described embodiments of the present disclosure without creative efforts, are within the protection scope of the present disclosure.

Unless otherwise defined, a technical or scientific term used herein shall have the ordinary meaning as understood by one of ordinary skill in the art to which the present disclosure belongs. The use of "first", "second", and the like in the present disclosure is not intended to indicate any order, quantity, or importance, but rather serves to distinguish one element from another. The word "comprising", "comprises", or the like means that the element or item preceding the word includes the element or item listed after the word and its equivalent, but does not exclude other elements or items. The word "connected", "coupled" or the like is not restricted to physical or mechanical connections, but may include electrical connections, whether direct or indirect.

It should be noted that the transistors used in the embodiments of the present disclosure may be thin film transistors or field effect transistors or other devices with the same and similar characteristics. Since a source electrode and a drain electrode of the adopted transistor are symmetrical to each other, the source electrode and the drain electrode can be interchanged. In the embodiments of the present disclosure, to distinguish the source electrode and the drain electrode of the transistor, one of the source electrode and the drain electrode is referred to as a first electrode, the other of the source electrode and the drain electrode is referred to as a second electrode, and a gate electrode is referred to as a control electrode. In addition, the transistors may be classified into N-type and P-type according to the characteristics of the transistors. When the N-type transistor is adopted, the first electrode is the drain electrode of the N-type transistor, and the second electrode is the source electrode of the N-type transistor. The situation is opposite for the P-type transistor. An "effective level" or "effective pulse" in the present disclosure refers to a level signal that can control a corresponding transistor to be turned on. Specifically, for the transistor to be controlled being the N-type transistor, its corresponding effective level (pulse) is a high level (pulse); and for the transistor to be controlled being the P-type transistor, its corresponding effective level (pulse) is low level (pulse).

A light emitting element in the present disclosure refers to a current-driven light emitting element including an OLED, a Light Emitting Diode (LED), and the like. In the embodiments of the present disclosure, an exemplary description will be given taking OLED as the light emitting element, where a first terminal and a second terminal of the light emitting device OLED refer to an anode terminal and a cathode terminal, respectively.

FIG. 1 is a schematic diagram illustrating a structure of a display device according to an embodiment of the present disclosure. As shown in FIG. 1, the display device includes a timing controller 4, a first driving circuit 2, a second driving circuit 3, and a display panel 1. The display panel 1 includes a plurality of pixel circuits PIX. The timing controller 4 may provide a first driving start signal STV1 and a second driving start signal STV2 to the first driving circuit 2 and the second driving circuit 3, respectively, at a fixed frequency, to control the first driving circuit 2 and the second driving circuit 3 to output, thereby controlling the pixel circuits PIX in the display panel 1 to operate.

As an example, if a fixed frequency of the driving start signals output by the timing controller 4 is aHZ, then the timing controller 4 provides the first/second driving start signal STV1/STV2 to the first/second driving circuit 2/3 for "a" times in 1 s, and each pixel circuit PIX is driven for "c" times in 1 s. That is, the display device has "a" fixed frames within 1 s. A value of "a" may be determined according to performance of a product. For example, "a" may generally take values of 60, 120, 240, and the like.

To adapt to different application scenes, the display device may display at different image refresh rates. In this case, the images are refreshed in units of display periods. An image refresh rate of bHZ means that the image is updated for "b" times within 1 s; and one display period corresponding to the image refresh rate of bHZ includes "a"/"b" fixed frames.

As an example, the fixed frequency of the driving start signals output by the timing controller 4 is 120 HZ, and the display device supports image refresh rates including 120 HZ, 60 HZ, 30 HZ, 10 HZ, and 1 HZ. When the image refresh rate is 120 HZ, the image is updated by the display device for 120 times within 1 s, and in this case, the corresponding one display period includes one fixed frame. When the image refresh rate is 60 HZ, the image is updated by the display device for 60 times within 1 s, and in this case, the corresponding one display period includes two fixed frames. When the image refresh rate is 30 HZ, the image is updated by the display device for 30 times within Is, and in this case, the corresponding one display period includes four fixed frames. When the image refresh rate is 10 HZ, the image is updated by the display device for 10 times within 1 s, and in this case, the corresponding one display period includes twelve fixed frames. When the image refresh rate is 1 HZ, the image is updated by the display device for 1 time within 1 s, and in this case, the corresponding one display period includes 120 fixed frames.

When one display period includes only one fixed frame, the fixed frame is a refresh frame. In the refresh frame, a data voltage for realizing image display is written to the pixel circuit PIX. Specifically, a threshold-compensated data voltage is written to the gate electrode of a driving transistor DTFT.

When the number of the fixed frames in one display period is more than or equal to 2, the $1^{st}$ fixed frame in the display period is a refresh frame, and the rest fixed frames are hold frames. In the hold frame, the display data voltage is not written to the pixel circuit PIX, and the voltage at the gate electrode of the driving transistor DTFT is held at the threshold-compensated data voltage in the refresh frame.

Specifically, in the related art, during the refresh frame, the display data voltage is written to the pixel circuit PIX for one time, and then the pixel circuit PIX performs threshold compensation on the driving transistor DTFT according to the display data voltage, to obtain a threshold-compensated display data voltage, and write the threshold-compensated display data voltage to the gate electrode of the driving transistor DTFT. Then, the driving transistor DTFT outputs a corresponding driving current according to the threshold-compensated display data voltage, to drive the light emitting element to emit light. During the hold frame, the display data voltage is not written to the pixel circuit PIX, and the voltage at the gate electrode of the driving transistor DTFT is held at the threshold-compensated data voltage in the refresh frame.

However, in practical applications, it is found that there may be a difference among the threshold-compensated data voltages for display written to the gate electrodes of the driving transistors in different pixel circuits PIX in a same refresh frame, and the different data voltages for display may cause different hysteresis effects, i.e., a difference in hysteresis, on the driving transistors DTFT. With the increase of the number of display frames, the difference of the influence of accumulated hysteresis on different driving transistors is larger and larger, which results in a larger and larger difference between electrical characteristics of different driving transistors. Thus, the display difference between different pixel circuits PIX is larger and larger, which further affects the display quality of the display device.

In order to effectively improve the technical problems existing in the related art, corresponding solutions are provided by the embodiments of the present disclosure.

Figure 2:
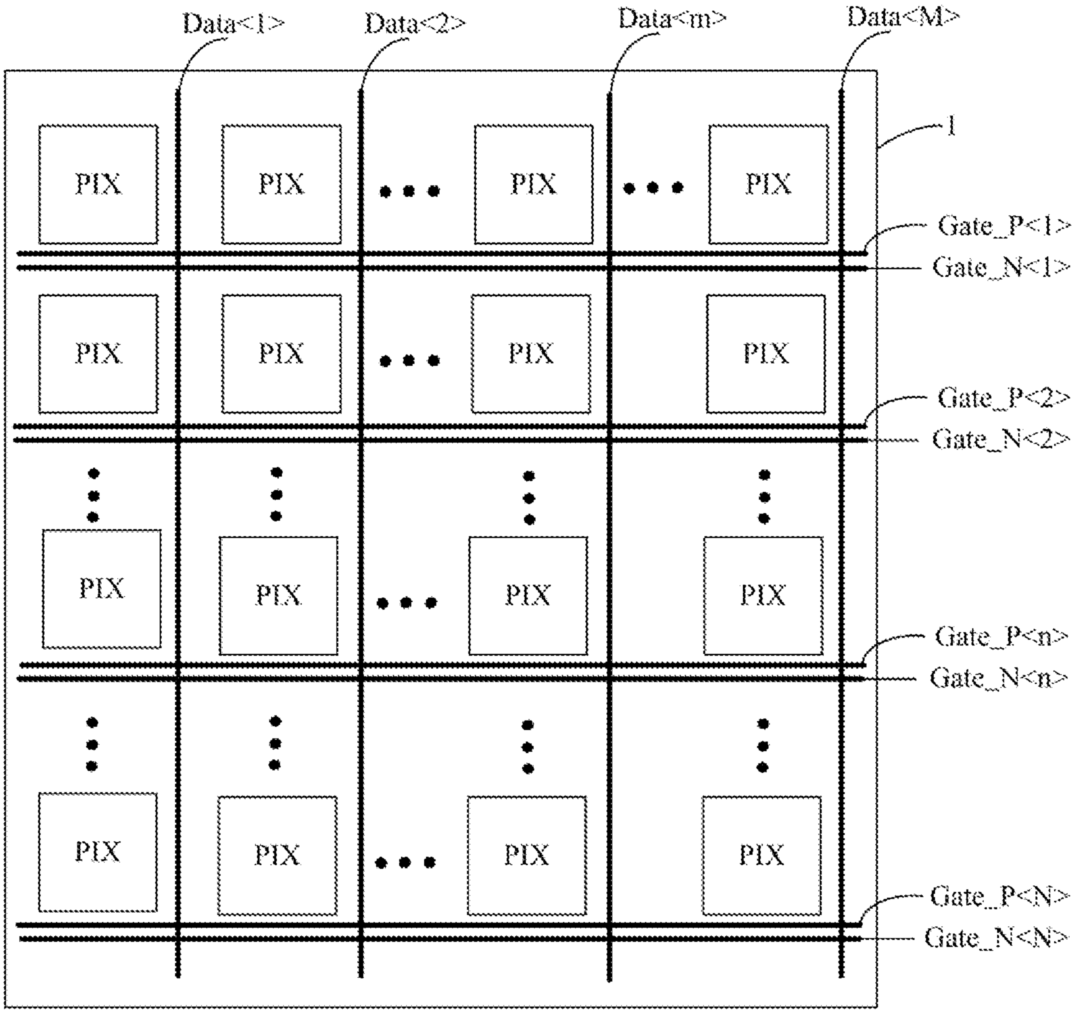
FIG. 2 is a schematic diagram illustrating a structure of display panel in an embodiment of the present disclosure.
Figure 3:
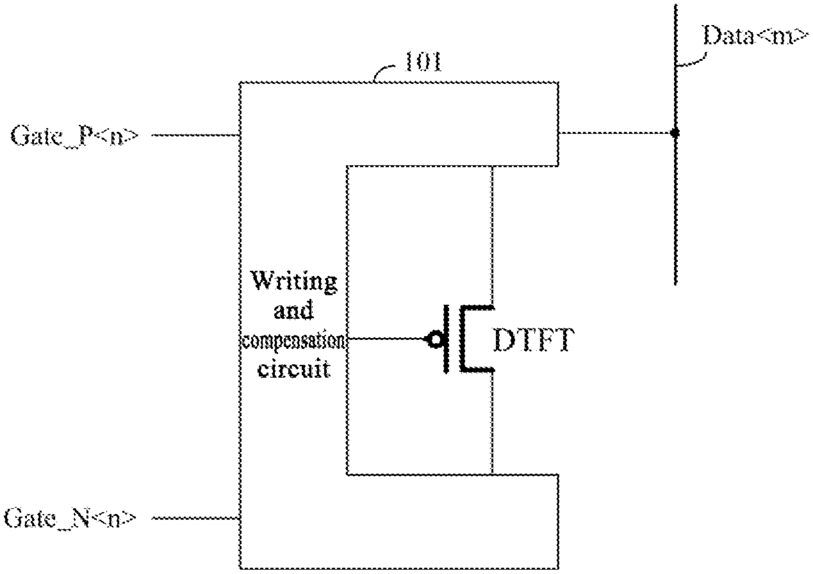
FIG. 3 is a schematic diagram illustrating a structure of a pixel circuit in an embodiment of the present disclosure.

FIG. 2 is a schematic diagram illustrating a structure of the display panel 1 in an embodiment of the present disclosure, and FIG. 3 is a schematic diagram illustrating a structure of the pixel circuit PIX in an embodiment of the present disclosure. As shown in FIGS. 1 to 3, the present disclosure provides a timing controller 4 applied to a display device. The display device includes a display panel 1, a first driving circuit 2, and a second driving circuit 3. The pixel circuit PIX includes a driving transistor DTFT and a writing and compensation circuit 101.

The writing and compensation circuit 101 is connected to a first electrode of the driving transistor DTFT, a second electrode of the driving transistor DTFT, and a gate electrode of the driving transistor DTFT, and is configured to write a non-display data voltage provided by a data line Data<n> to the first electrode of the driving transistor DTFT, in response to control by a first effective level signal provided by a first control signal line Gate_P<n>, and perform threshold compensation process on the driving transistor DTFT and write a threshold-compensated display data voltage to the gate electrode of the driving transistor DTFT, in response to control by the first effective level signal provided by the first control signal line Gate_P<n> and a second effective level signal provided by a second control signal line Gate_N<n>.

The first driving circuit 2 is connected to the first control signal lines Gate_P<n> arranged for the plurality of pixel circuits PIX, and the first driving circuit 2 is configured to sequentially output the first effective level signal to the respective first control signal lines Gate_P<n> according to the first driving start signal STV1. The number of effective pulses included in the first driving start signal STV1 is equal to the number of the first effective level signals output by the first driving circuit 2 to each of the first control signal lines Gate_P<n>.

The second driving circuit 3 is connected to the second control signal lines Gate_N<n> arranged for the plurality of pixel circuits PIX, and the second driving circuit 3 is configured to sequentially output the second effective level signal to the respective second control signal lines Gate_N<n> according to the second driving start signal STV2. The number of effective pulses included in the second driving start signal STV2 is equal to the number of the second effective level signals output by the second driving circuit 3 to each of the second control signal lines Gate_N<n>.

The timing controller 4 is connected to the first driving circuit 2 and the second driving circuit 3, and the timing controller 4 is configured to provide the first driving start signal STV1 to the first driving circuit 2 and the second driving start signal STV2 to the second driving circuit 3 during the refresh frame in the display period, where the number of effective pulses in the first driving start signal STV1 is W, W≥2 and W is an integer.

It should be noted that, in FIG. 2, only N first control signal lines Gate_P<1> to Gate_P<N> and N second control signal lines Gate_N<1> to Gate_N<N>, and M data lines data<1> to data<M> are exemplarily shown.

In the embodiments of the present disclosure, during the refresh frame in the display period, the timing controller 4 provides the first driving start signal STV1 having W effective pulses to the first driving circuit 2, and provides the second driving start signal STV2 to the second driving circuit 3. In this case, the first driving circuit 2 outputs W first effective level signals to each of the first control signal lines Gate_P<n>, and the second driving circuit 3 outputs the second effective level signals to each of the second control signal lines Gate_N<n>.

In the embodiment of the present disclosure, during the refresh frame, the number W of the effective pulses in the first driving start signal STV1 is more than or equal to 2 (i.e., W≥2), so that one of the effective pulses can be used to control the pixel circuit PIX to perform image update, and at least one of the effective pulses can be used to control the pixel circuit to perform hysteresis reduction. For the specific procedures of the image update and the hysteresis reduction, see the following description. According to the technical solution of the present disclosure, the hysteresis reduction process is added into the refresh frame, so that the problem of display difference between different pixel circuits PIX can be effectively improved, and the display quality can be improved. However, when the display device is switched between different image refresh rates, there is a significant problem of flicker.

In some embodiments, during the refresh frame, a time segment corresponding to at least one effective pulse in the first driving start signal STV1 is within a time segment corresponding to the effective pulse in the second driving start signal STV2 (for performing image update), and a time segment corresponding to at least one effective pulse in the first driving start signal STV1 is outside the time segment corresponding to the effective pulse in the second driving start signal STV2 (for performing hysteresis reduction).

For the pixel circuit PIX, during the refresh frame, the writing and compensation circuit 101 performs the threshold compensation process for one time on the driving transistor DTFT in response to control by the first effective level signal and the second effective level signal, and writes the threshold-compensated display data voltage to the gate electrode of the driving transistor DTFT to perform the image update. In addition, the writing and compensation circuit 101 writes the non-display data voltage provided by the data line Data<n> to the first electrode of the driving transistor DTFT, for W−1 times, in response to control by the first effective level signal, while the voltage at the gate electrode of the driving transistor DTFT is held at the threshold-compensated display data voltage during the refresh frame, so that the driving transistor DTFT is in a bias (stress) state to implement hysteresis reduction (i.e., perform hysteresis reduction for W−1 times).

It should be noted that in the embodiments of the present disclosure, the non-display data voltage, which is written to the first electrode of the driving transistor DTFT to perform hysteresis reduction on the driving transistor DTFT, may be the same as or different from the display data voltage written during the image update.

Figure 4A:
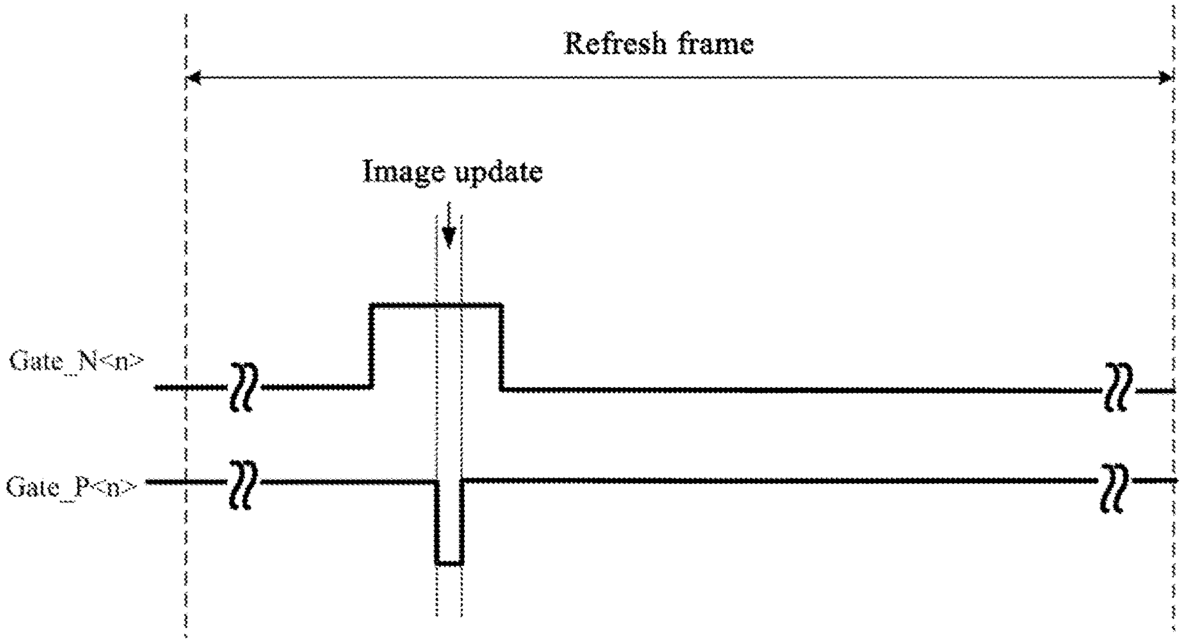
FIG. 4A is a timing diagram illustrating operation of a pixel circuit during a refresh frame in the related art.
Figure 4B:
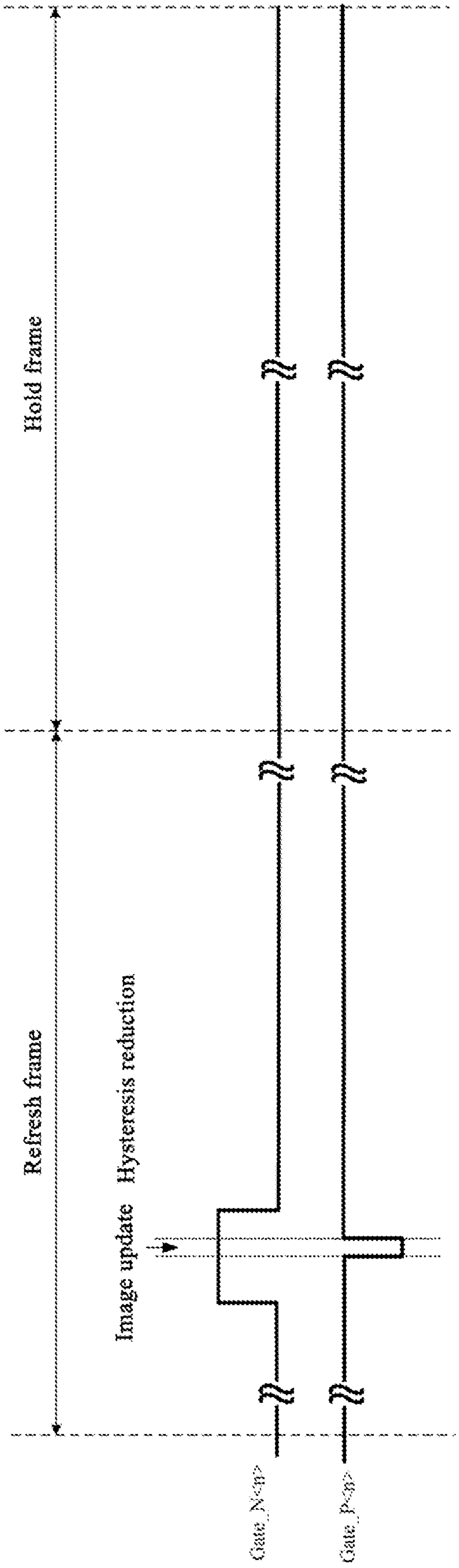
FIG. 4B is a timing diagram illustrating operation of a pixel circuit during a refresh frame and a hold frame in the related art.
Figure 5A:
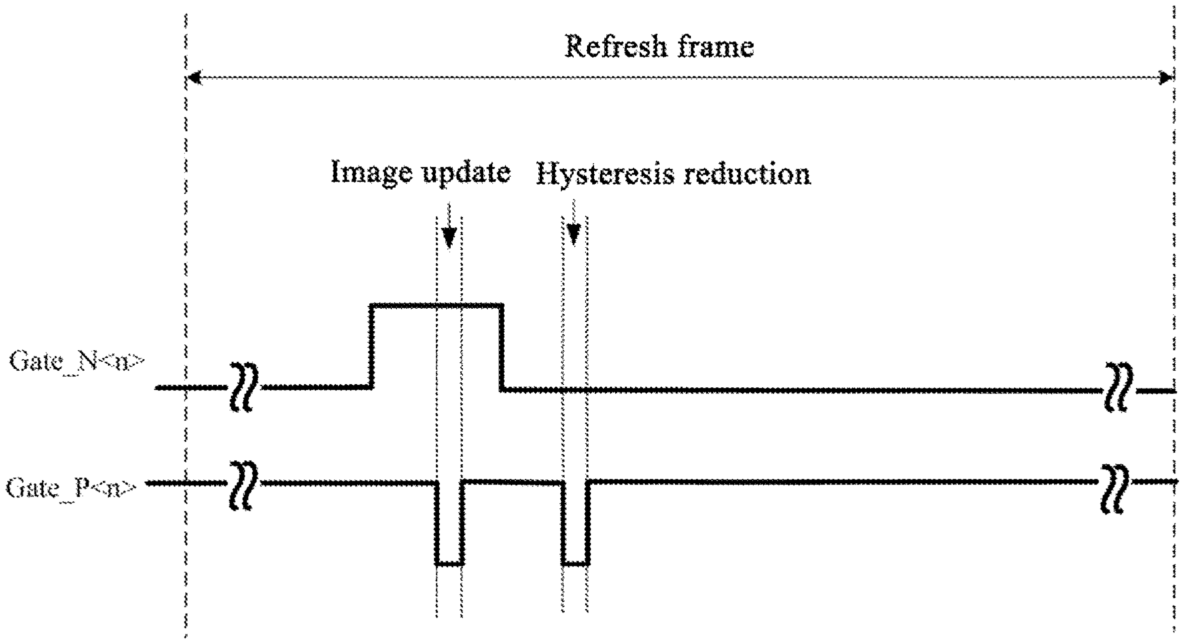
FIG. 5A is a timing diagram illustrating operation of a pixel circuit during a refresh frame in an embodiment of the present disclosure.
Figure 5B:
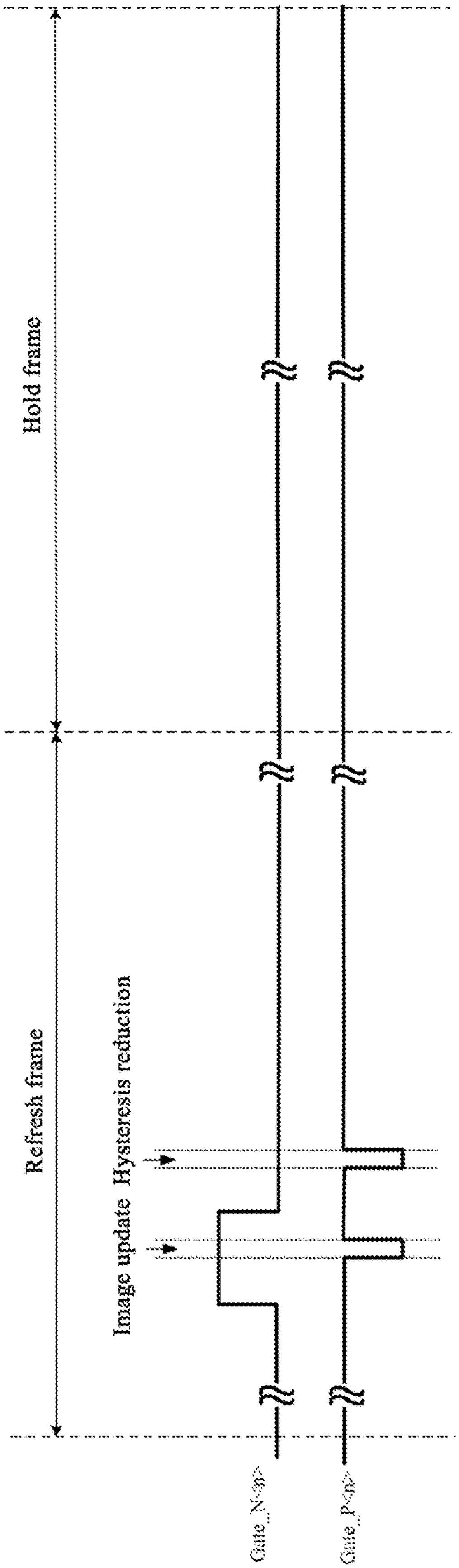
FIG. 5B is a timing diagram illustrating operation of a pixel circuit during a refresh frame and a hold frame in an embodiment of the present disclosure.

FIG. 4A is a timing diagram illustrating operation of a pixel circuit during a refresh frame in the related art; FIG. 4B is a timing diagram illustrating operation of a pixel circuit during a refresh frame and a hold frame in the related art; FIG. 5A is a timing diagram illustrating operation of a pixel circuit during a refresh frame in an embodiment of the present disclosure; and FIG. 5B is a timing diagram illustrating operation of a pixel circuit during a refresh frame and a hold frame in an embodiment of the present disclosure. Referring to FIGS. 4A to 5B, in the related art, during the refresh frame, each pixel circuit PIX is controlled by the first control signal line Gate_P<n> and the second control signal line Gate_N<n>, and a process of writing the threshold-compensated display data voltage to the gate electrode of the driving transistor DTFT is performed for only one time, without performing the hysteresis reduction process. However, in the present disclosure, during the refresh frame, each pixel circuit PIX is controlled by the first control signal line Gate_P<n> and the second control signal line Gate_N<n>, and not only the process of writing the threshold-compensated display data voltage to the gate electrode of the driving transistor DTFT is performs for one time, but also the hysteresis reduction process is performed for W−1 times.

It should be noted that FIGS. 5A and 5B only exemplarily show a case where W takes a value of 2, and this case only serves as an example.

In some embodiments, the second driving start signal is not supplied to the second driving circuit by the timing controller during the hold frame.

Compared with the data writing process performed only once during the refresh frame in the related art, in the technical solution of the embodiments of the present disclosure, during the refresh frame, not only the data writing process is performed, but also the hysteresis reduction process is performed for W−1 times, so that the difference in hysteresis in different pixel circuits can be effectively reduced through the hysteresis reduction process; and accordingly, the display difference between different pixel circuits PIX can be effectively reduced, and the display quality of the display device can be improved.

However, in practical applications, it is found that a hysteresis reduction process is added to the refresh frame, so that the problem of display difference between different pixel circuits PIX can be effectively improved, and the display quality can be improved; however, when the display device is switched between different image refresh rates, there is a significant problem of flicker.

The present disclosure further analyzes the reasons for the problem of flicker occurring when switching between different image refresh rates, and finds the followings.

In the technical solution of the foregoing embodiments, during the refresh frame, the display data voltage is written for one time to update the image, and the non-display data voltage is written for W−1 times for hysteresis reduction; while during the hold frame, neither writing of the display data voltage nor hysteresis reduction is performed. Under different image refresh rates, since the frame numbers of refresh frames in a unit time are different, the numbers of times of hysteresis reduction performed on the same pixel circuit PIX are different, which will cause the same driving transistor DTFT to have a difference in hysteresis at different image refresh rates, and further cause a significant problem of flicker when switching between different image refresh rates.

In order to effectively solve the problem of flicker occurring during the above-mentioned process of switching the image refresh rates, the present disclosure further improves the technical solution of the foregoing embodiments. Specifically, the difference in hysteresis of the driving transistor DTFT at different image refresh rates is reduced by reducing a percentage of difference between time numbers of hysteresis reduction at different image refresh rates, so that the problem of flicker when switching between image refresh rates is solved.

The percentage of difference between time numbers of hysteresis reduction at an image refresh rate of b1 HZ and an image refresh rate of b2 HZ is: $|X\_b1-X\_b2|/X\_b1$, where X_b1 represents the time number of hysteresis reduction in a unit time (e.g., 1 s) at the image refresh rate of b1 HZ, and X_b2 represents the time number of hysteresis reduction in the unit time at the image refresh rate of b2 HZ.

In order to reduce the percentage of difference between time numbers of hysteresis reduction at different image refresh rates, in the embodiments of the present disclosure, the timing controller 4 is specifically configured to: provide the first driving start signal to the first driving circuit in each fixed frame in the display period, and the number of effective pulses in the first driving start signal in each fixed frame is W. That is, the timing controller 4 provides the first driving start signal having W effective pulses to the first driving circuit not only in the refresh frame but also in the hold frame when the hold frame is included in the display period.

In some embodiments, the timing controller 4 does not provide the second driving start signal to the second driving circuit during the hold frame.

During the refresh frame of the display period, the timing controller 4 provides the first driving start signal STV1 having W effective pulses to the first driving circuit 2, and provides the second driving start signal STV2 to the second driving circuit 3. A time segment corresponding to at least one effective pulse in the first driving start signal STV1 is within a time segment corresponding to the effective pulse in the second driving start signal STV2, and a time segment corresponding to at least one effective pulse in the first driving start signal STV1 is outside the time segment corresponding to the effective pulse in the second driving start signal STV2. In this case, the first driving circuit 2 outputs W first effective level signals to each of the first control signal lines Gate_P<n>, and the second driving circuit 3 outputs the second effective level signal to each of the second control signal lines Gate_N<n>.

During the hold frame in the display period (if there is the hold frame in the display period), the timing controller 4 provides the first driving start signal STV1 having W effective pulses to the first driving circuit 2, and does not provide the second driving start signal STV2 to the second driving circuit 3. In this case, the first driving circuit 2 outputs W first effective level signals to each of the first control signal lines Gate_P<n>, and the second driving circuit 3 does not output the second effective level signal.

Therefore, in this embodiment, during the refresh frame, the display data voltage is written by the pixel circuit PIX for one time to update the image, and the non-display data voltage is written for W−1 times for hysteresis reduction. During the hold frame, the non-display data voltage is written by the pixel circuit for W times for hysteresis reduction.

In order to facilitate a clear understanding of the technical solution of the present disclosure for those skilled in the art, a detailed description is given below with reference to specific examples.

Figure 6A:
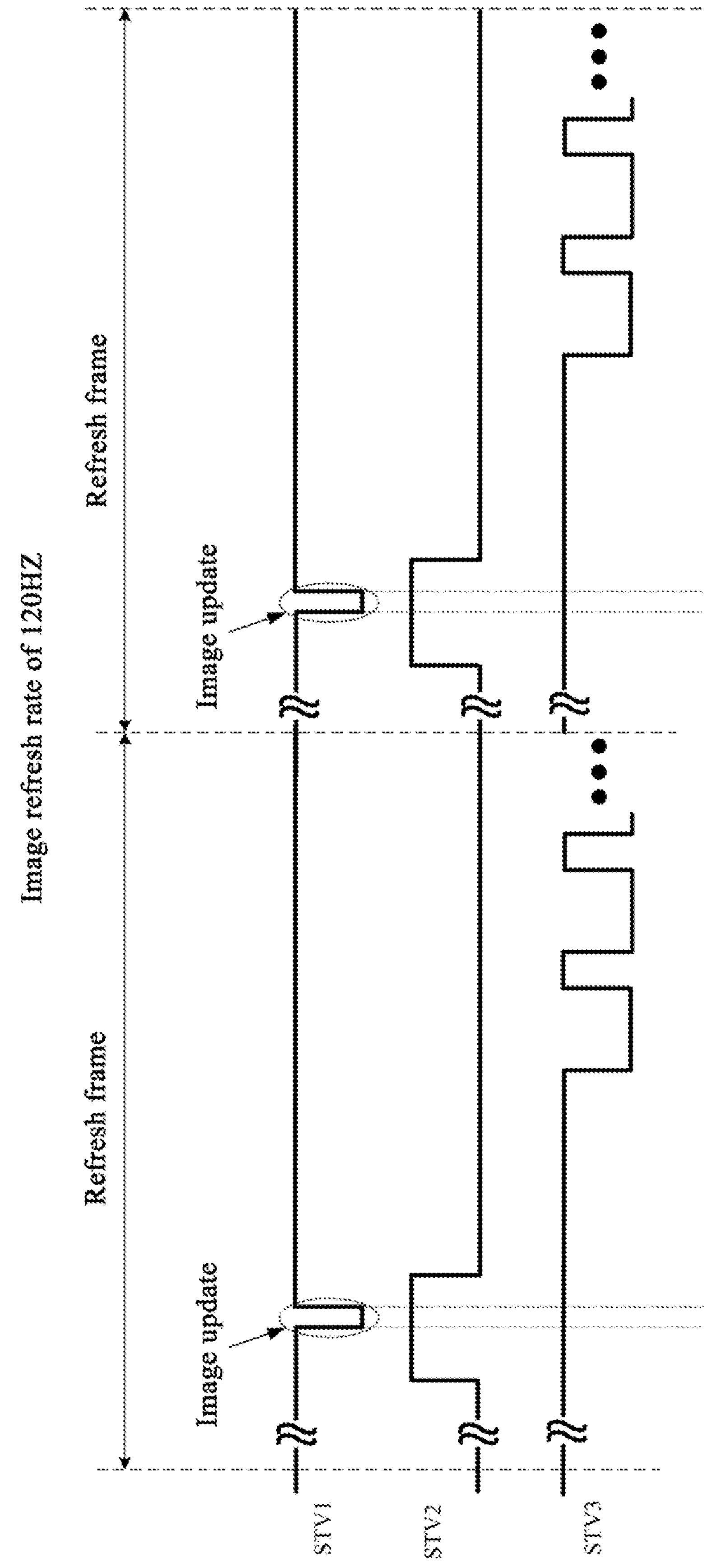
FIG. 6A is a timing diagram illustrating different driving start signals output by a timing controller at an image refresh rate of 120 HZ when hysteresis reduction is not performed during a hold frame in the present disclosure.
Figure 6B:
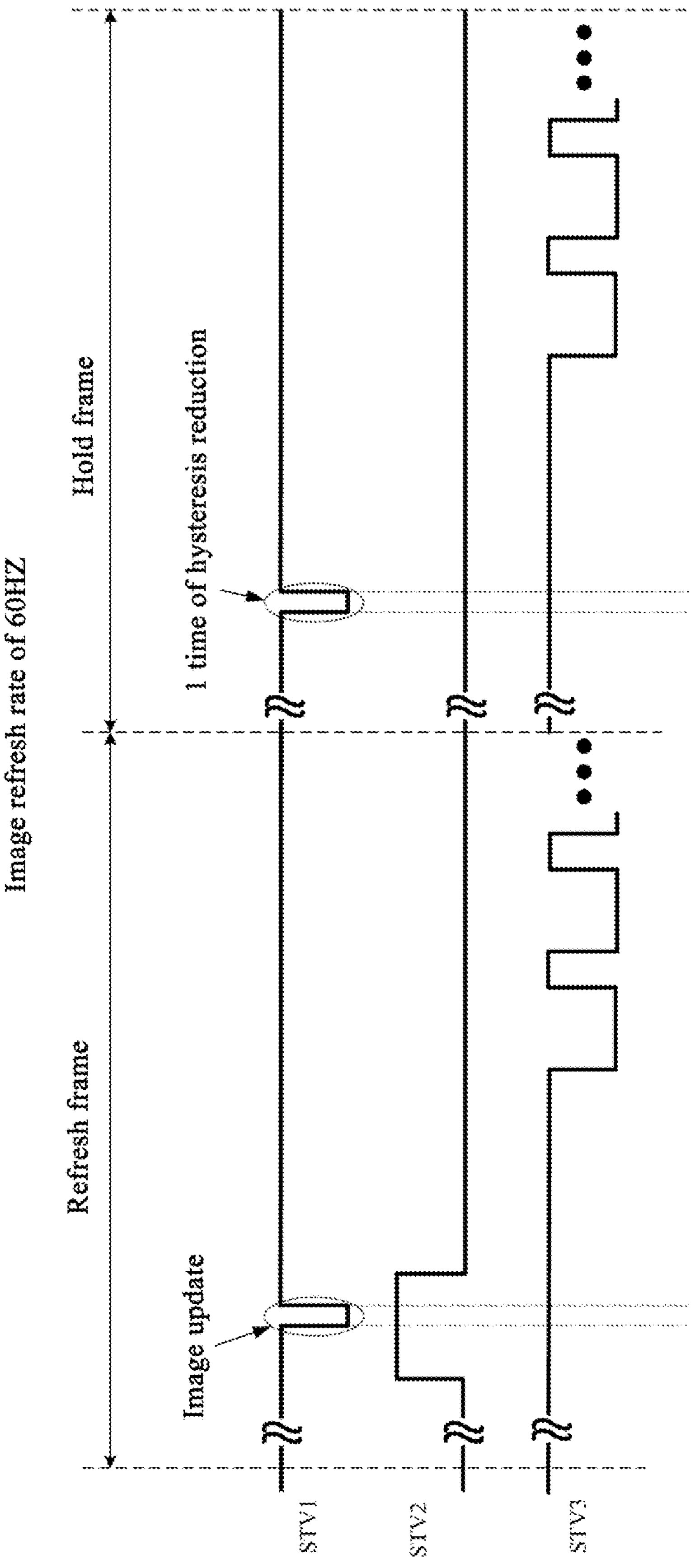
FIG. 6B is a timing diagram illustrating different driving start signals output by a timing controller at an image refresh rate of 60 HZ when hysteresis reduction is not performed during a hold frame in the present disclosure.
Figure 7A:
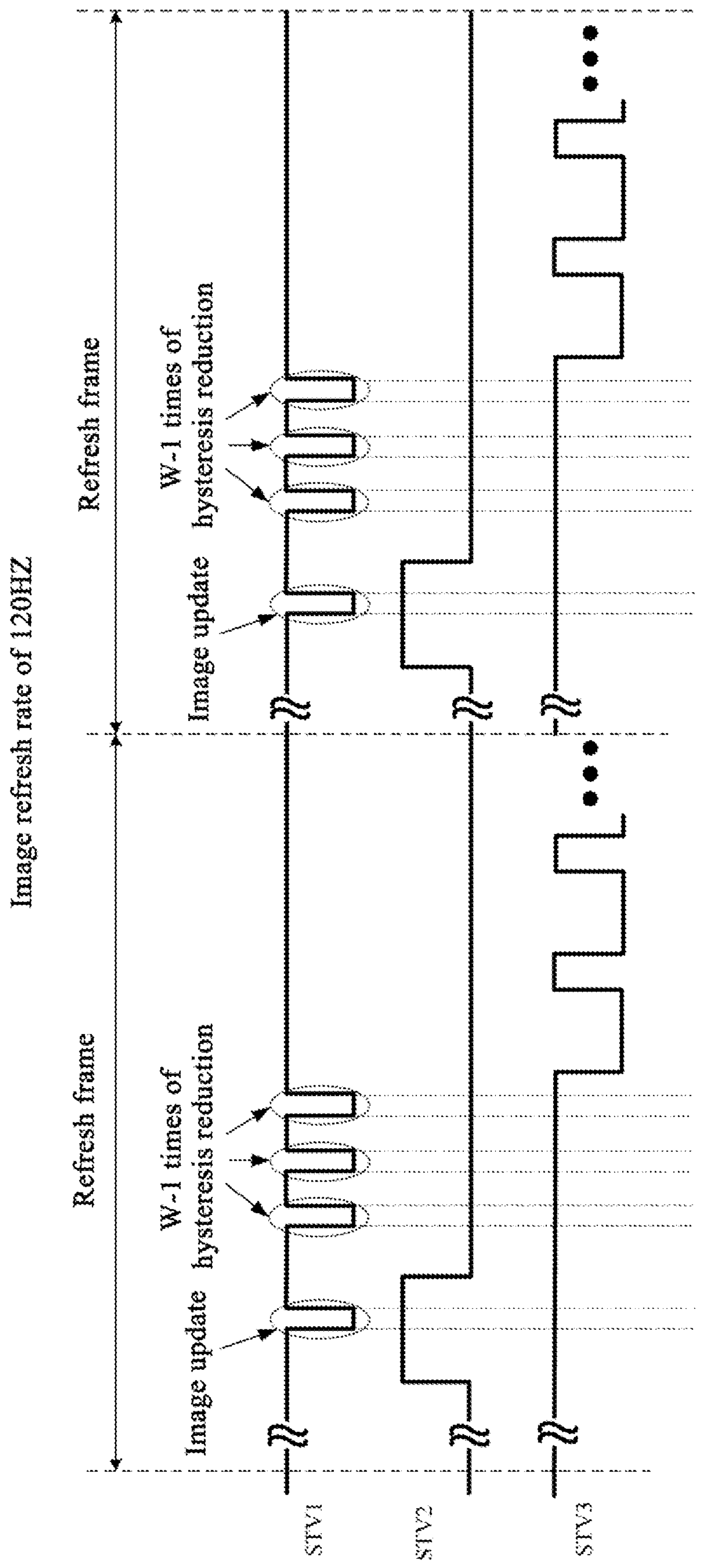
FIG. 7A is a timing diagram illustrating different driving start signals output by a timing controller at an image refresh rate of 120 HZ when hysteresis reduction is performed during a hold frame in the present disclosure.
Figure 7B:
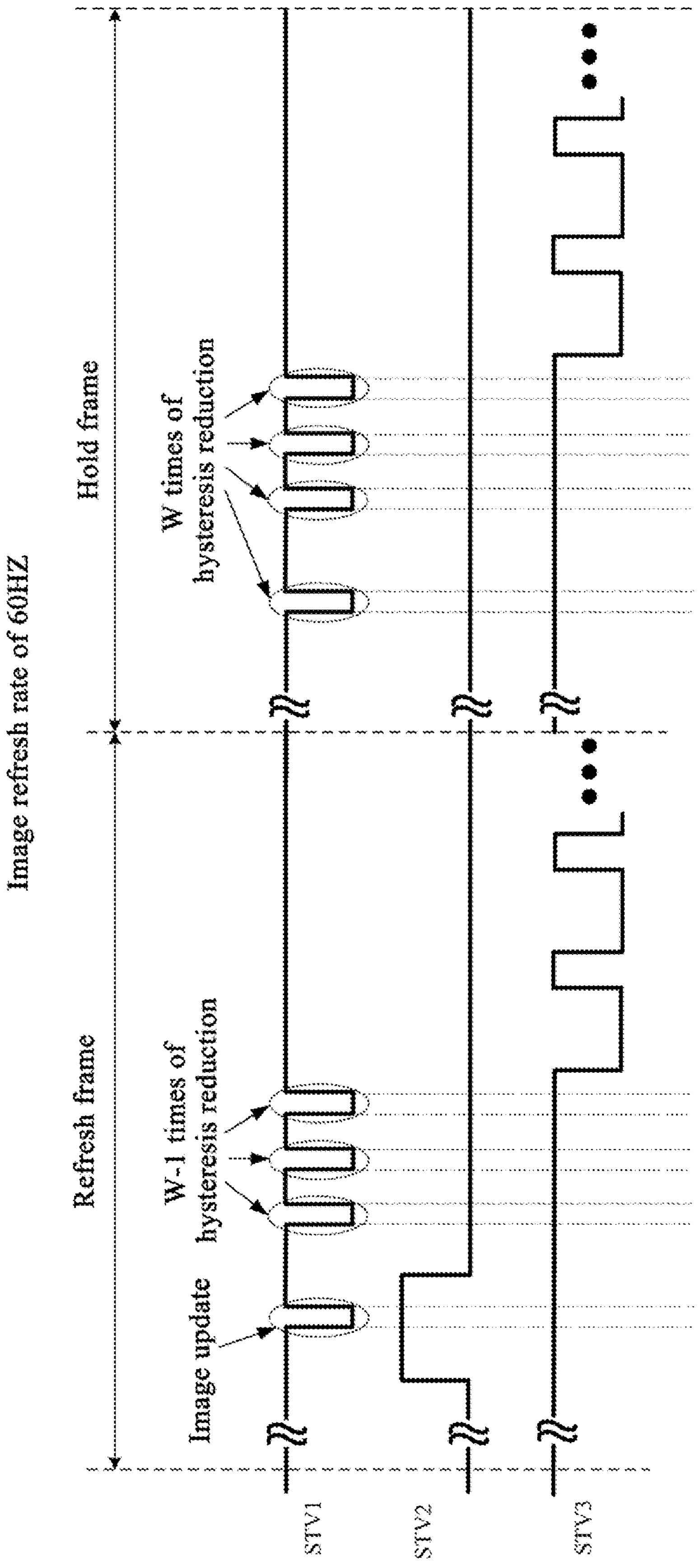
FIG. 7B is a timing diagram illustrating different driving start signals output by a timing controller at an image refresh rate of 60 HZ when hysteresis reduction is performed during a hold frame in the present disclosure.

FIG. 6A is a timing diagram illustrating different driving start signals output by a timing controller at an image refresh rate of 120 HZ when hysteresis reduction is not performed during a hold frame in the present disclosure, FIG. 6B is a timing diagram illustrating different driving start signals output by a timing controller at an image refresh rate of 60 HZ when hysteresis reduction is not performed during a hold frame in the present disclosure, FIG. 7A is a timing diagram illustrating different driving start signals output by a timing controller at an image refresh rate of 120 HZ when hysteresis reduction is performed during a hold frame in the present disclosure, and FIG. 7B is a timing diagram illustrating different driving start signals output by a timing controller at an image refresh rate of 60 HZ when hysteresis reduction is performed during a hold frame in the present disclosure. As shown in FIGS. 6A to 7B, the fixed frequency of the driving start signals output by the timing controller 4 is 120 HZ, and the display device supports an image refresh rate including 120 HZ, 60 HZ, 30 HZ, 10 HZ, and 1 HZ. When the image refresh rate is 120 HZ, 120 refresh frames and 0 hold frame are included in 1 s; when the image refresh rate is 60 HZ, 60 refresh frames and 60 hold frames are included in 1 s; when the image refresh rate is 30 HZ, 30 refresh frames and 90 hold frames are included in 1 s; when the image refresh rate is 10 HZ, 10 refresh frames and 110 hold frames are included in 1 s; and when the image refresh rate is 1 HZ, 1 refresh frame and 119 hold frames are included in 1 s.

It is exemplarily shown in FIGS. 6A to 7B that the effective pulse in the first driving start signal STV1 is a low level pulse and the effective pulse in the second driving start signal STV2 is a high level pulse, and this case only serves as an example. In addition, timings in time segments corresponding to two fixed frames at the image refresh rates of 120 HZ and 60 HZ, where W takes a value of 4, are merely exemplarily show in FIGS. 6A to 7B.

In the technical solution where hysteresis reduction is not performed during a hold frame, 120 times of image update and 120 W−120 times of hysteresis reduction are performed within 1 s when the image refresh rate is 120 HZ; 60 times of image update and 60 W−60 times of hysteresis reduction are performed within Is when the image refresh rate is 60 HZ; 30 times of image update and 30 W−30 times of hysteresis reduction are performed within 1 s when the image refresh rate is 30 HZ; 10 times of image update and 10 W−10 times of hysteresis reduction are performed within Is when the image refresh rate is 10 HZ; and 1 time of image update and W−1 times of hysteresis reduction are performed within 1 s when the image refresh rate is 1 HZ.

In the technical solution where hysteresis reduction is performed during a hold frame, 120 times of image update and 120 W−120 times of hysteresis reduction are performed within 1 s when the image refresh rate is 120 HZ; 60 times of image update and 120 W−60 times of hysteresis reduction are performed within Is when the image refresh rate is 60 HZ; 30 times of image update and 120 W−30 times of hysteresis reduction are performed within Is when the image refresh rate is 30 HZ; 10 times of image update and 120 W−10 hysteresis reductions are performed within 1 s when the image refresh rate is 10 HZ; and 1 time of image update and 120 W−1 times of hysteresis reduction are performed within Is when the image refresh rate is 1 HZ.

Table 1 below is a table showing comparison between the time numbers of hysteresis reduction within 1 s for different image refresh rates in two solutions, where hysteresis reduction is not performed during a hold frame and hysteresis reduction is performed during a hold frame, respectively.

TABLE 1 a table showing comparison between the time numbers of hysteresis reduction within 1 s for different image refresh rates in two solutions, where hysteresis reduction is not performed during a hold frame and hysteresis reduction is performed during a hold frame, respectively

| image refresh rate | hysteresis reduction is not performed during a hold frame | hysteresis reduction is performed during a hold frame |
|---|---|---|
| 120 HZ | 120 W-120 | 120 W-120 |
| 60 HZ | 60 W-60 | 120 W-60 |
| 30 HZ | 30 W-30 | 120 W-30 |
| 10 HZ | 10 W-10 | 120 W-10 |
| 1 HZ | W-1 | 120 W-1 |

In the related art, the percentage of difference between time numbers of hysteresis reduction at an image refresh rate of 60 HZ and an image refresh rate of 120 HZ is: |60 W−60−(120 W−120)|/(60 W−60)=100%; the percentage of difference between time numbers of hysteresis reduction at an image refresh rate of 30 HZ and an image refresh rate of 60 HZ is: |30 W−30−(60 W−60)|/(30 W−30)=100%; the percentage of difference between time numbers of hysteresis reduction at an image refresh rate of 10 HZ and an image refresh rate of 30 HZ is: |10 W−10−(30 W−30)|/(10 W−10) =200%; the percentage of difference between time numbers of hysteresis reduction at an image refresh rate of 1 HZ and an image refresh rate of 10 HZ is: |W−1−(10 W−10)|/(W−1)−900%.

In the present disclosure, the percentage of difference between time numbers of hysteresis reduction at an image refresh rate of 60 HZ and an image refresh rate of 120 HZ is: [120 W−60−(120 W−120)]/(120 W−60)=60/(120 W−60) ≤100%; the percentage of difference between time numbers of hysteresis reduction at an image refresh rate of 30 HZ and an image refresh rate of 60 HZ is: [120 W−30−(120 W−60)]/(120 W−30)=30/(120 W−30)≤1/3<100%; the percentage of difference between time numbers of hysteresis reduction at an image refresh rate of 10 HZ and an image refresh rate of 30 HZ is: [120 W−10−(120 W−30)]/(120 W−10)=20/(120 W−10)≤2/11<200%; the percentage of difference between time numbers of hysteresis reduction at an image refresh rate of 1 HZ an and image refresh rate of 10 HZ is:

$$[120W-1-(120W-10)]/(120W-1)=9/(120W-1)\leq 9/119<900\%.$$

Based on the above, it can be seen that, compared with the technical solution where hysteresis reduction is not performed during a hold frame, in the technical solution where hysteresis reduction is performed during a hold frame in this embodiment, the percentage of difference between time numbers of hysteresis reduction at different image refresh rates can be effectively reduced, which is beneficial to reducing the difference in hysteresis of the driving transistor DTFT at different image refresh rates, thereby solving or mitigating the problem of flicker occurring during the process of switching the image refresh rates.

Referring to FIG. 7B, in some embodiments, during the refresh frame, the second driving start signal STV2 includes one effective pulse, a time segment corresponding to the $1^{st}$ effective pulse in the first driving start signal STV1 is within a time segment corresponding to the effective pulse in the second driving start signal STV2, and time segments corresponding to the effective pulses except for the $1^{st}$ effective pulse in the first driving start signal STV1 are all outside the time segment corresponding to the effective pulse in the second driving start signal STV2.

In some embodiments, a ratio of an effective pulse width of the effective pulse in the second driving start signal STV2 to an effective pulse width of the $1^{st}$ effective pulse in the first driving start signal STV1 is in a range of 3:1 to 14:1, for example, 3:1, 4:1, 5:1, 6:1, 7:1, 8:1, 10:1, 12:1, 14:1, or the like.

In some embodiments, the effective pulse width of the $1^{st}$ effective pulse in the first driving start signal STV1 is in a range of 2 μs to 5 μs, for example, 2 μs, 3 μs, 4 μs, 5 μs, or the like.

In some embodiments, the effective pulse widths of respective effective pulses in the first driving start signal STV1 are all equal to each other. In practical applications, a clock signal is required to arranged for the first driving circuit 2, where a period and a duty ratio of the clock signal is required to be adapted to the effective pulse width of the effective pulse in the first driving start signal STV1. That is, for effective pulses with different effective pulse widths in the driving start signal, the period and/or the duty ratio of the clock signal arranged for the first driving circuit 2 are required to be adjusted accordingly. In the embodiments of the present disclosure, the effective pulse widths of the effective pulses in the first driving start signal STV1 are set to be equal to each other, so that the first driving circuit 2 can continuously output a plurality of first effective level signals to the first control signal lines Gate_P<n> without adjusting the clock signal arranged for the first driving circuit 2, thereby reducing the difficulty of timing control during the operation of the first driving circuit 2.

In some embodiments, a sum of the effective pulse widths of all the effective pulses in the first driving start signal STV1 is equal throughout respective fixed frames in the display period. With such a setting, total time lengths of hysteresis reduction processing are close to or equal to each other in the respective fixed frames in the display period (note that the total time length of hysteresis reduction processing in the refresh frame is slightly less than the total time length of hysteresis reduction processing in the hold frame, and the total time lengths of hysteresis reduction processing in respective hold frames are equal to each other), so that the uniformity of the display brightness of the respective frames in the display period is improved.

In some embodiments, a waveform of the first driving start signal STV1 is the same, throughout respective fixed frames in the display period. That is, the timing controller 4 may output the first driving start signal STV1 with the same waveform in each fixed frame, to reduce the difficulty of timing control on the timing controller 4.

In the embodiments of the present disclosure, the larger the value of W is, the smaller the percentage of difference between time numbers of hysteresis reduction at different image refresh rates is, which is more beneficial to reducing the difference in hysteresis of the driving transistor DTFT at different image refresh rates. However, this case results in a larger overall power consumption of the display device. Based on a combination of reducing difference in hysteresis and power consumption, in some embodiments, it is set to be $2\leq W\leq 6$.

Figure 8:
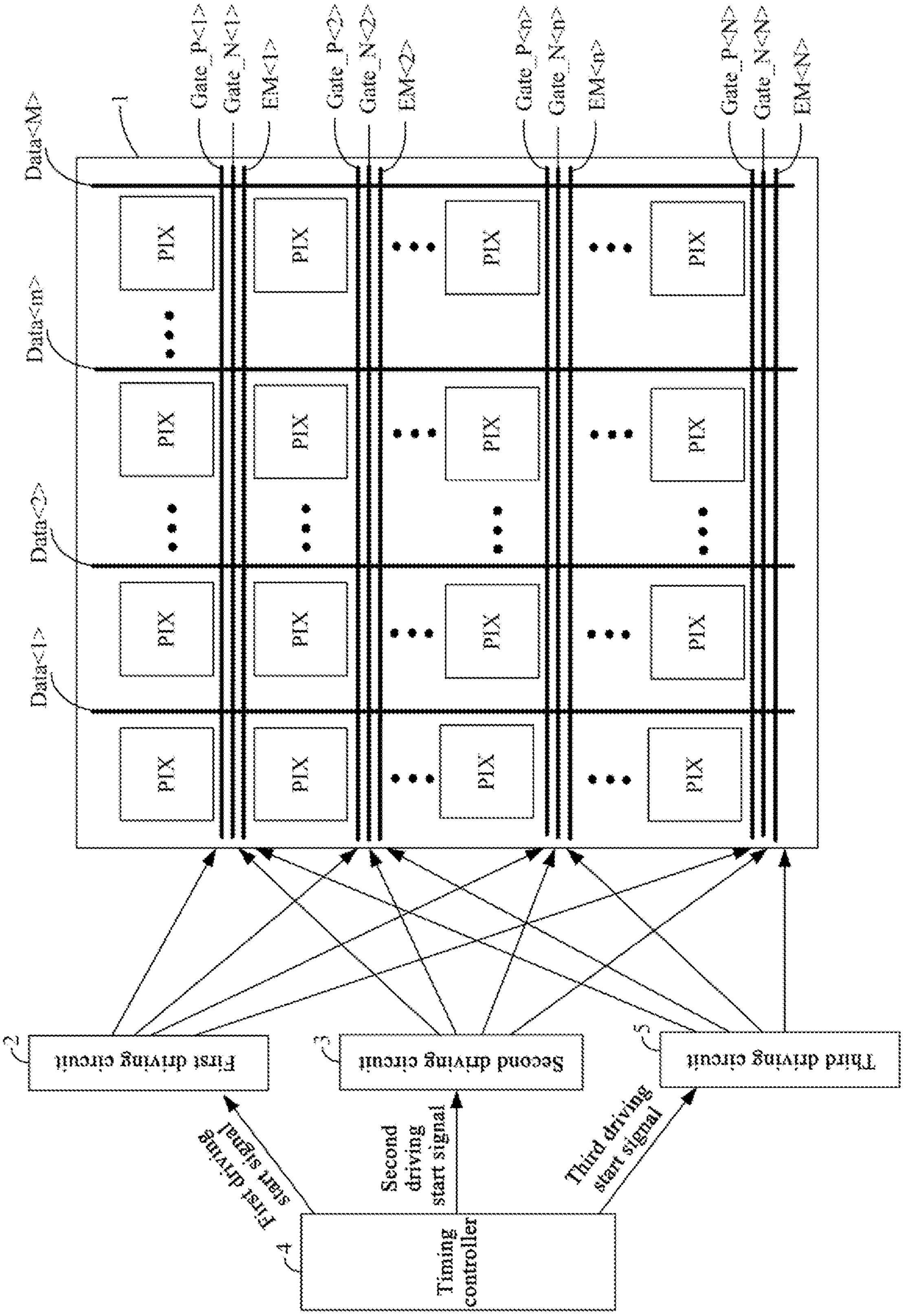
FIG. 8 is a schematic diagram illustrating another structure of a display device in an embodiment of the present disclosure.
Figure 9:
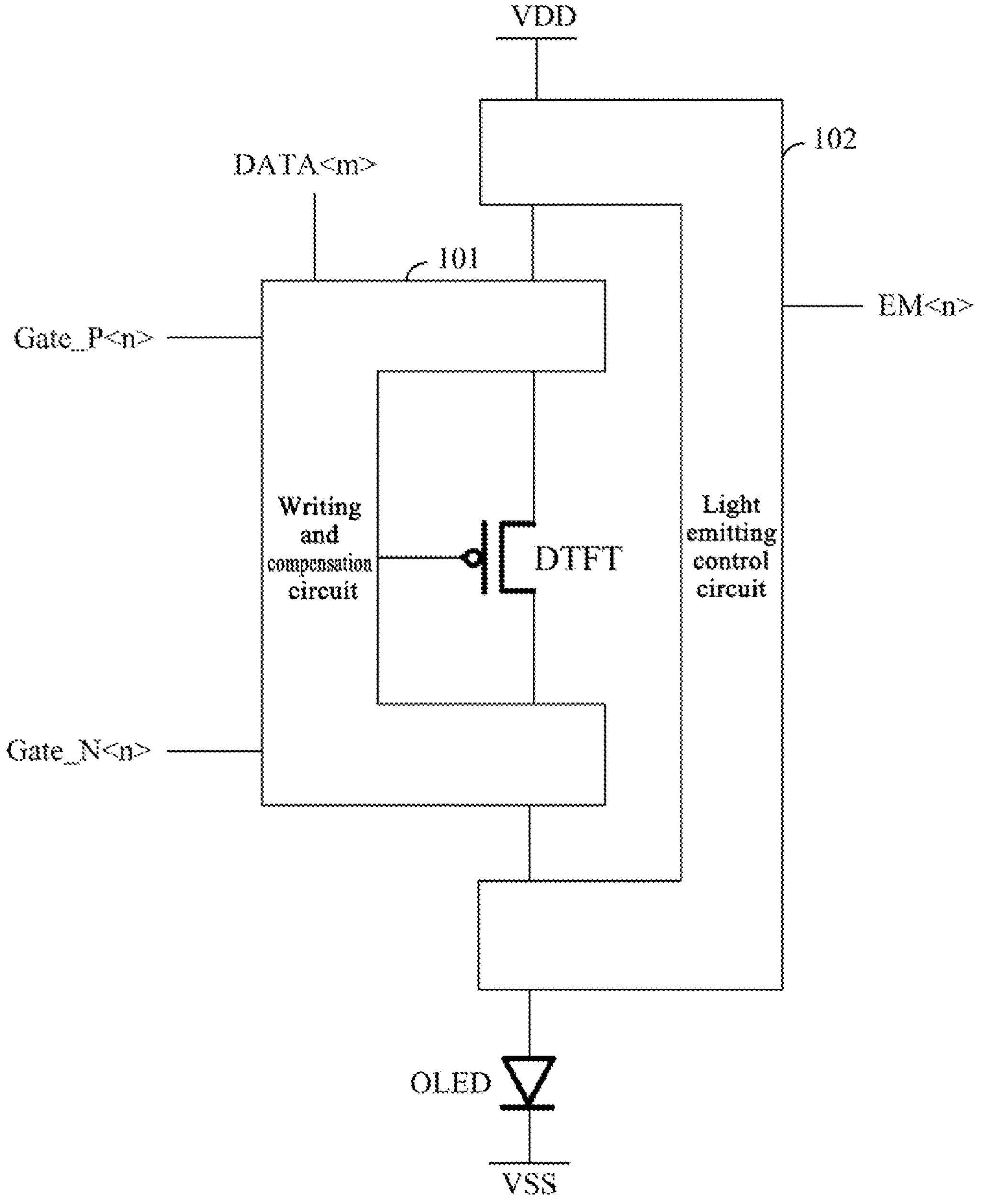
FIG. 9 is a schematic diagram illustrating another structure of a pixel circuit in an embodiment of the present disclosure.

FIG. 8 is a schematic diagram illustrating another structure of a display device in an embodiment of the present disclosure, and FIG. 9 is a schematic diagram illustrating another structure of a pixel circuit PIX in an embodiment of the present disclosure. As shown in FIGS. 8 and 9, in some embodiments, the display device further includes a third driving circuit 5; and the pixel circuit PIX further includes a light emitting control circuit 102 and a light emitting element OLED. The light emitting control circuit 102 is connected to a first operating voltage supply terminal, the first electrode of the driving transistor DTFT, the second electrode of the driving transistor DTFT, and a first terminal of the light emitting element OLED, and is configured to form a conductive path between the first operating voltage supply terminal and the first electrode of the driving transistor DTFT and form a conductive path between the second electrode of the driving transistor DTFT and the light emitting element OLED, in response to control by a third effective level signal provided by a third control signal line EM<n>. A second terminal of the light emitting element OLED is connected to a second operating voltage supply terminal. The third driving circuit 5 is connected to the third control signal lines EM<n> arranged for the plurality of pixel circuits PIX, and the second driving circuit 3 is configured to sequentially output a third effective level signal to respective third control signal lines EM<n> according to a third driving start signal STV3. The timing controller 4 is further configured to provide the third driving start signal STV3 to the third driving circuit 5 in each fixed frame in the display period.

N first control signal lines Gate_P<1> to Gate_P<N>, N second control signal lines Gate_N<1> to Gate_N<N>, N third control signal lines EM<1> to EM<N>, and M data lines Date<1> to Date<M> are merely exemplarily shown in FIG. 8.

Referring again to FIGS. 7A and 7B, in some embodiments, the third driving start signal STV3 includes at least one effective pulse; and there is no overlap between a time segment corresponding to the effective pulse in the first driving start signal STV1 and a time segment corresponding to the effective pulse in the third driving start signal STV3.

In some embodiments, during the refresh frame, the second driving start signal STV2 includes one effective pulse, and time segments corresponding to other effective pulses except for the $1^{st}$ effective pulse in the first driving start signal STV1 are all subsequent to a time segment corresponding to the effective pulse in the second driving start signal STV2 and prior to a time segment corresponding to the $1^{st}$ effective pulse in the third driving start signal STV3.

In some embodiments, during the hold frame, a time segment corresponding to each effective pulse in the first driving start signal STV1 is prior to the time segment corresponding to the $1^{st}$ effective pulse in the third driving start signal STV3.

Based on the same inventive concept, an embodiment of the present disclosure further provides a display device. Referring to FIGS. 1 and 8, the display device includes the timing controller 4 provided in the foregoing embodiments. For the detailed description of the timing controller 4, reference may be made to the contents in the foregoing embodiments, and details are not repeated herein.

Figure 10:
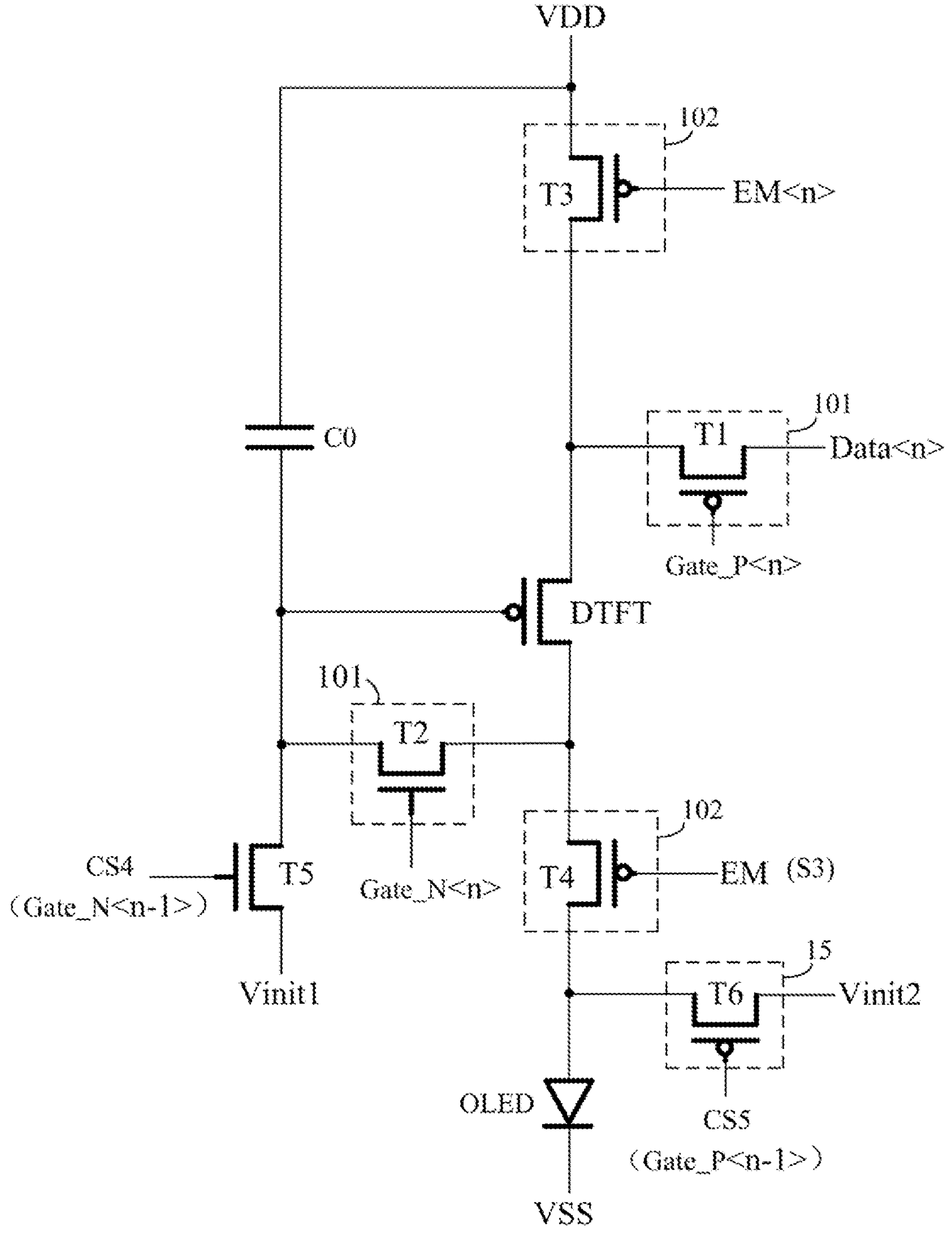
FIG. 10 is a schematic diagram illustrating another circuit structure of a pixel circuit in an embodiment of the present disclosure.

The display device further includes a display panel 1, which includes a plurality of pixel circuits PIX. FIG. 10 is a schematic diagram illustrating another circuit structure of a pixel circuit PIX in an embodiment of the present disclosure. As shown in FIG. 10, in some embodiments, the pixel circuit PIX includes a driving transistor DTFT, a writing and compensation circuit 101, a light emitting control circuit 102, and a light emitting element OLED.

The writing and compensation circuit 101 is connected to a first electrode of the driving transistor DTFT, a second electrode of the driving transistor DTFT, and a gate electrode of the driving transistor DTFT, and is configured to write a non-display data voltage provided by the data line Data<n> to the first electrode of the driving transistor DTFT in response to control by the first effective level signal provided by the first control signal line Gate_P<n>, and perform threshold compensation processing on the driving transistor DTFT and write a threshold-compensated display data voltage to the gate electrode of the driving transistor DTFT, in response to control by the first effective level signal provided by the first control signal line Gate_P<n> and the second effective level signal provided by the second control signal line Gate_N<n>.

The light emitting control circuit 102 is connected to the first operating voltage supply terminal, the first electrode of the driving transistor DTFT, the second electrode of the driving transistor DTFT, and the first terminal of the light emitting element OLED, and is configured to form a conductive path between the first operating voltage supply terminal and the first electrode of the driving transistor DTFT and form a conductive path between the second electrode of the driving transistor DTFT and the light emitting element OLED, in response to control by the third effective level signal provided by the third control signal line EM<n>.

The second terminal of the light emitting element OLED is connected to a second operating voltage supply terminal.

In some embodiments, the writing and compensation circuit 101 includes a first transistor T1 and a second transistor T2.

A control electrode of the first transistor T1 is connected to the first control signal line Gate_P<n>, a first electrode of the first transistor T1 is connected to the data line Data<n>, and a second electrode of the first transistor T1 is connected to the first electrode of the driving transistor DTFT.

A control electrode of the second transistor T2 is connected to the second control signal line Gate_N<n>, a first electrode of the second transistor T2 is connected to the gate electrode of the driving transistor DTFT, and a second electrode of the second transistor T2 is connected to the second electrode of the driving transistor DTFT.

In some embodiments, the lighting control circuit 102 includes a third transistor T3 and a fourth transistor T4.

A control electrode of the third transistor T3 is connected to the third control signal line EM<n>, a first electrode of the third transistor T3 is connected to the first operating voltage supply terminal, and a second electrode of the third transistor T3 is connected to the first electrode of the driving transistor DTFT.

A control electrode of the fourth transistor T4 is connected to the third control signal line EM<n>, a first electrode of the fourth transistor T4 is connected to the second electrode of the driving transistor DTFT, and a second electrode of the fourth transistor T4 is connected to the first terminal of the light emitting element OLED.

In some embodiments, the pixel circuit PIX further includes a fifth transistor T5.

A control electrode of the fifth transistor T5 is connected to a fourth control signal line CS4, a first electrode of the fifth transistor T5 is connected to the gate electrode of the driving transistor DTFT, and a second electrode of the fifth transistor T5 is connected to a first reset voltage supply terminal.

In some embodiments, the pixel circuit PIX further includes a sixth transistor T6.

A control electrode of the sixth transistor T6 is connected to a fifth control signal line CS5, a first electrode of the sixth transistor T6 is connected to a second reset voltage supply terminal, and a second electrode of the sixth transistor T6 is connected to the first terminal of the light emitting element OLED.

In some embodiments, the pixel circuit PIX further includes a capacitor C0. One terminal of the capacitor C0 is connected to the first operating voltage supply terminal, and the other terminal of the capacitor C0 is connected to the gate electrode of the driving transistor DTFT.

In some embodiments, transistors (the first transistor T1 and the fifth transistor T5 in FIG. 10) in the pixel circuit PIX directly connected to the gate electrode of the driving transistor DTFT are Low Temperature Polycrystalline Oxide (LTPO) transistors (a type of N-type transistors), and other transistors (the second transistor T2, the third transistor T3, the fourth transistor T4, the sixth transistor T6, and the driving transistor DTFT) in the pixel circuit PIX are Low Temperature Polycrystalline Silicon (LTPS) transistors (a type of P-type transistors). The low-temperature polycrystalline silicon transistor has high carrier mobility and can be rapidly switched between a turned-on state and a turned-off state. The low temperature polycrystalline oxide transistor has a very small leakage current, to ensure stability of the voltage at the gate electrode of the driving transistor DTFT.

In some embodiments, the plurality of pixel circuits PIX are arranged in an array in a row direction and a column direction, and each row of pixel circuits PIX is provided with a corresponding one of the second control signal lines Gate_N<n>. The fourth control signal line CS4 connected to the pixel circuit PIX is the second control signal line Gate_N<n−1> arranged for a previous row of pixel circuits PIX.

In some embodiments, the plurality of pixel circuits PIX are arranged in an array in a row direction and a column direction, and each row of pixel circuits PIX is provided with a corresponding one of the first control signal lines Gate_P<n>. The fifth control signal line CS5 connected to the pixel circuit PIX is the first control signal line Gate_P<n−1> arranged for a previous row of pixel circuits PIX.

With the above arrangement, the number of the control signal lines required for the pixel circuit PIX can be reduced.

The operation of the pixel circuit PIX shown in FIG. 8 will be described in detail with reference to the drawings. The first operating voltage supply terminal provides a first operating voltage VDD, the second operating voltage supply terminal provides a second operating voltage VSS, the first reset voltage supply terminal provides a first reset voltage Vinit1, and the second reset voltage supply terminal provides a second reset voltage Vinit2.

Figure 11:
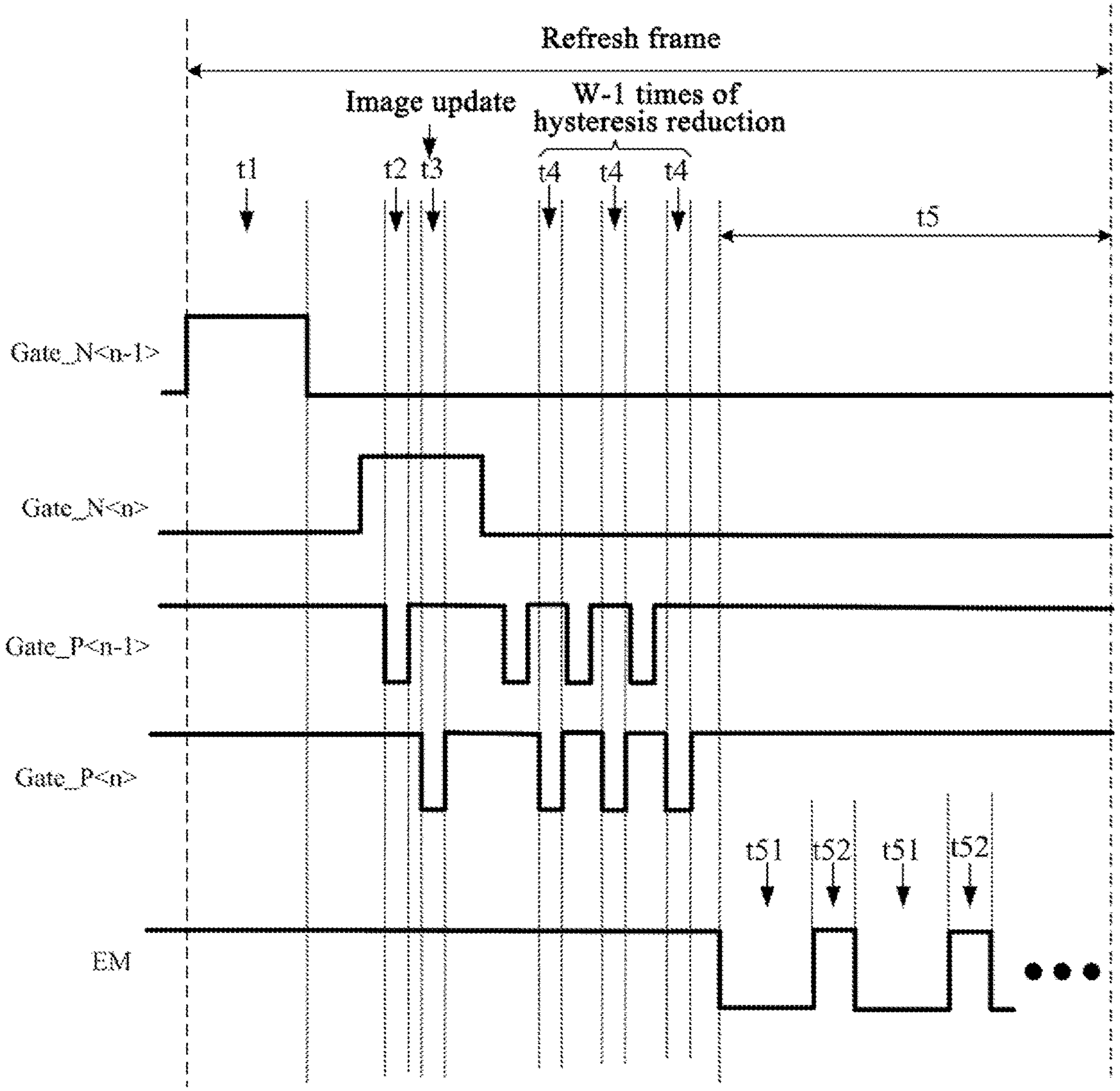
FIG. 11 is a timing diagram illustrating operation of the pixel circuit shown in FIG. 10 during a refresh frame.

FIG. 11 is a timing diagram illustrating operation of the pixel circuit PIX shown in FIG. 10 during a refresh frame. As shown in FIG. 11, the operation process of the pixel circuit PIX during the refresh frame includes a first reset phase t1, a second reset phase t2, a writing and compensation phase t3, W−1 hysteresis reduction phases t4 and a light emitting phase t5.

During the first reset phase t1, the first control signal line Gate_P<n> provides a high level signal, the second control signal line Gate_N<n> provides a low level signal, the third control signal line EM<n> provides a high level signal, the fourth control signal line CS4 provides a high level signal, and the fifth control signal line CS5 provides a high level signal. In this case, the fifth transistor T5 is turned on, and the first transistor T1, the second transistor T2, the third transistor T3, the fourth transistor T4, and the sixth transistor T6 are all turned off.

Since the fifth transistor T5 is turned on, the first reset voltage Vinit1 is written to the gate electrode of the driving transistor DTFT through the fifth transistor T5, to reset the gate electrode of the driving transistor DTFT.

During the second reset phase t2, the first control signal line Gate_P<n> provides a high level signal, the second control signal line Gate_N<n> provides a high level signal, the third control signal line EM<n> provides a high level signal, the fourth control signal line CS4 provides a low level signal, and the fifth control signal line CS5 provides a low level signal. In this case, the second transistor T2 and the sixth transistor T6 are both turned on, and the first transistor T1 and the second transistor T5 are both turned off.

Since the sixth transistor T6 is turned on, the second reset voltage Vinit2 is written to the first terminal of the light emitting element OLED through the sixth transistor T6, to reset the first terminal of the light emitting element OLED.

During the writing and compensation phase t3, the first control signal line Gate_P<n> provides a low level signal, the second control signal line Gate_N<n> provides a high level signal, the third control signal line EM<n> provides a high level signal, the fourth control signal line CS4 provides a low level signal, and the fifth control signal line CS5 provides a high level signal. In this case, the first transistor T1 and the second transistor T2 are both turned on, and the third transistor T3, the fourth transistor T4, the fifth transistor T5 and the sixth transistor T6 are all turned off.

Since the first transistor T1 is turned on, the display data voltage provided by the data line Data<n> is written to the first electrode of the driving transistor DTFT through the first transistor T1. In this case, since the second transistor T2 is turned on, a driving current generated by the driving transistor DTFT charges the gate electrode of the driving transistor DTFT through the second transistor T2, and the driving transistor DTFT is turned off when the voltage at the gate electrode of the driving transistor DTFT rises to Vdata+Vth, where Vdata is the display data voltage, and Vth is a threshold voltage of the driving transistor DTFT (generally, Vth≤0V). That is, when the first control signal line Gate_P<n> and the second control signal line Gate_N<n> both provide an effective level, the threshold-compensated display data voltage is written by the pixel circuit PIX to the gate electrode of the driving transistor DTFT.

During the hysteresis reduction phase t4, the first control signal line Gate_P<n> provides a low level signal, the second control signal line Gate_N<n> provides a low level signal, the third control signal line EM<n> provides a high level signal, the fourth control signal line CS4 provides a low level signal, and the fifth control signal line CS5 provides a high level signal. In this case, the first transistor T1 is turned on, and the second transistor T2, the third transistor T3, the fourth transistor T4, the fifth transistor T5, and the sixth transistor T6 are all turned off.

Since the first transistor T1 is turned on, the non-display data voltage (which may be the same as or different from the display data voltage in the writing and compensation phase t3) provided by the data line Data<n> is written to the first electrode of the driving transistor DTFT through the first transistor T1, so that the driving transistor DTFT is in a stress state, to perform hysteresis reduction on the driving transistor DTFT.

Between the writing and compensation phase t3 and the light emitting phase t5, the hysteresis reduction phase t4 is repeated for W−1 times.

During the light emitting phase t5, the first control signal line Gate_P<n> provides a high level signal, the second control signal line Gate_N<n> provides a low level signal, the fourth control signal line CS4 provides a low level signal, and the fifth control signal line CS5 provides a high level signal. The third control signal line EM<n> may always provide a low level signal, or alternately provide a low level signal and a high level signal.

A case where the third control signal line EM<n> alternately provides a low level signal and a high level signal is taken as an example. The light emitting phase t5 may be divided into a light emitting sub-phase t51 and a non-light-emitting sub-phase t52. During the light emitting sub-phase t51, the third control signal line EM<n> provides a low level signal; and during the non-light-emitting sub-phase t52, the third control signal line EM<n> provides a high level signal.

During the light emitting sub-phase t51, the third transistor T3 and the fourth transistor T4 are both turned on, and the first transistor T1, the second transistor T2, the fifth transistor T5 and the sixth transistor T6 are all turned off. In this case, the driving transistor DTFT outputs a corresponding driving current according to the voltage at the gate electrode thereof; and the saturated driving current formula of the driving transistor DTFT can be obtained as follows:

$$
\begin{aligned}
I &= K*(V_{gs}-V_{th})^2 \\
&= K*(V_{data}+V_{th}-VDD-V_{th})^2. \\
&= K*(V_{data}-VDD)^2
\end{aligned}
$$

In the formula, K is a constant (of which the magnitude is related to the electrical characteristics of the driving transistor DTFT), and Vgs is the gate-source voltage of the driving transistor DTFT. As can be seen from the above formula, the driving current of the driving transistor DTFT is related to only the display data voltage Vdata and the first operating voltage VDD, and is not related to the threshold voltage Vth of the driving transistor DTFT, so that the driving current flowing through the light emitting element OLED is prevented from being affected by the unevenness and drift of the threshold voltage, and the uniformity of the driving current flowing through the light emitting element OLED is effectively improved.

In the non-light-emitting sub-phase t52, the first to sixth transistors T1 to T6 are all turned off. The driving transistor DTFT outputs no driving current, and the light emitting element OLED does not emit light.

During the light emitting phase t5, the number and duration of respective light emitting sub-phases t51 and respective non-light-emitting sub-phases t52 may be set according to practical requirements, and specifically, may be controlled by the waveform of the third driving start signal STV3.

Figure 12:
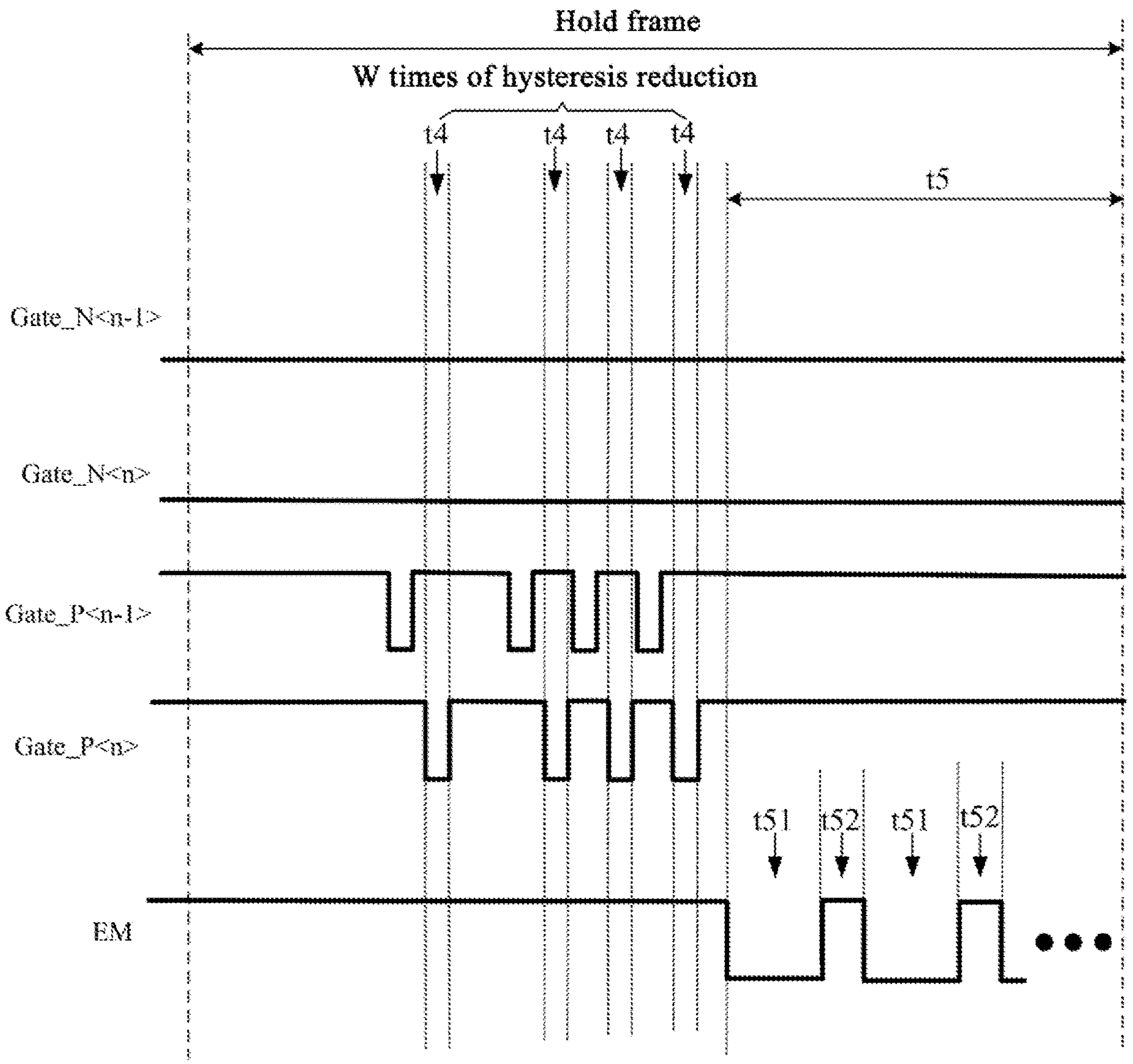
FIG. 12 is a timing diagram illustrating operation of the pixel circuit shown in FIG. 10 during a refresh frame.

FIG. 12 is a timing diagram illustrating operation of the pixel circuit shown in FIG. 10 during a refresh frame. As shown in FIG. 12, the operation of the pixel circuit during the refresh frame includes a second reset phase t2, W hysteresis reduction phases t4 and a light emitting phase t5. For the specific description of the second reset phase t2, the hysteresis reduction phase t4 and the light emitting phase t5, reference may be made to the foregoing description, and details are not repeated herein.

Figure 13:
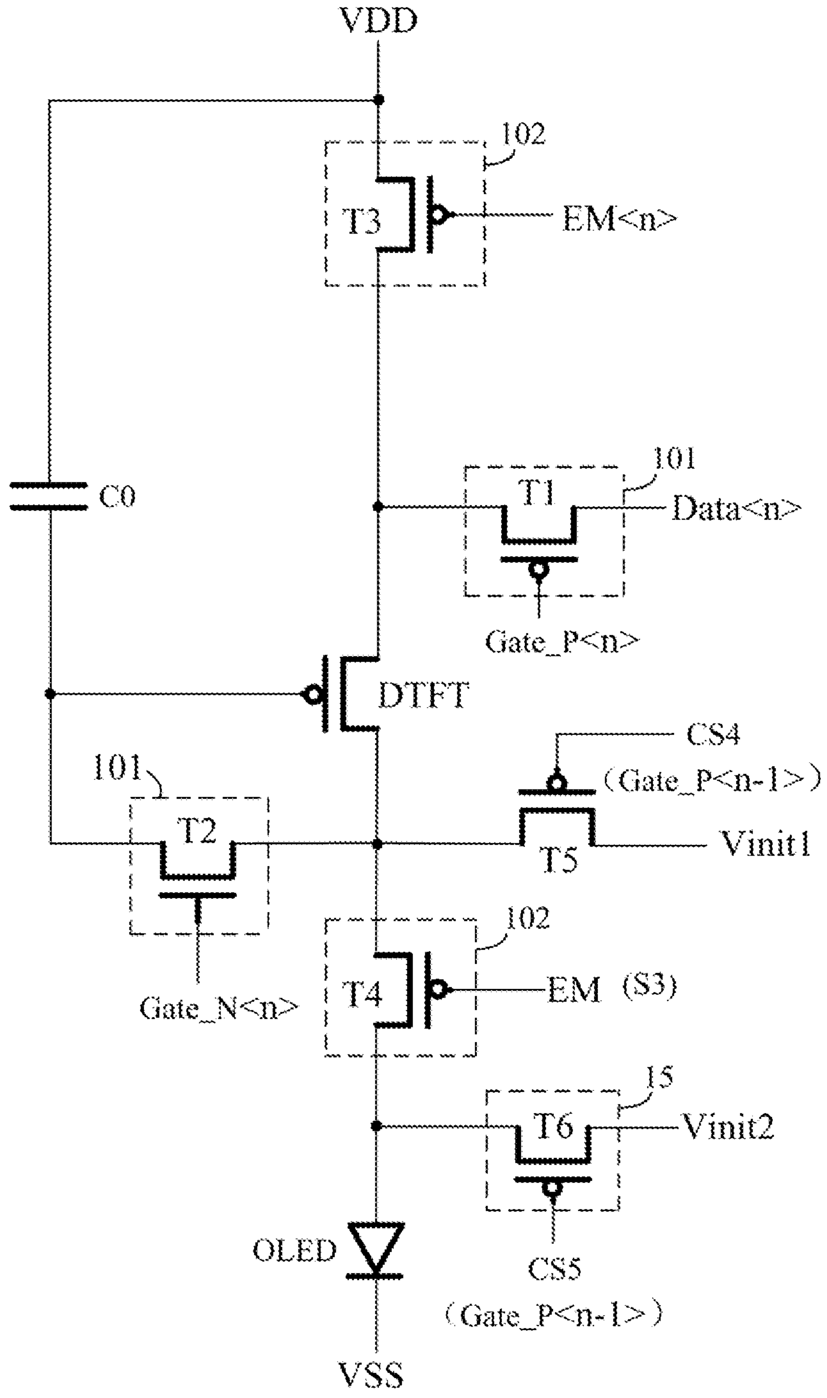
FIG. 13 is a schematic diagram illustrating another circuit structure of a pixel circuit in an embodiment of the present disclosure.

FIG. 13 is a schematic diagram illustrating another circuit structure of a pixel circuit in an embodiment of the present disclosure. As shown in FIG. 13, unlike in FIG. 10, in the pixel circuit shown in FIG. 13, the control electrode of the fifth transistor T5 is connected to the fourth control signal line CS4, the first electrode of the fifth transistor T5 is connected to the second electrode of the driving transistor, and the second electrode of the fifth transistor T5 is connected to the first reset voltage supply terminal.

In this case, only the second transistor T2 is an N-type transistor (e.g., a low temperature polycrystalline oxide transistor), and the first transistor T1, the third to sixth transistors T3 to T6, and the driving transistor are all P-type transistors (e.g., low temperature poly-silicon transistors).

In some embodiments, the plurality of pixel circuits are arranged in an array in a row direction and a column direction, and each row of pixel circuits is provided with a corresponding one of the first control signal lines Gate_P<n>. The fourth control signal line CS4 connected to the control electrode of the fifth transistor in the pixel circuit is the first control signal line Gate_P<n−1> arranged for a previous row of pixel circuits. With the above arrangement, the number of control signal lines required for the pixel circuit is reduced.

Figure 14:
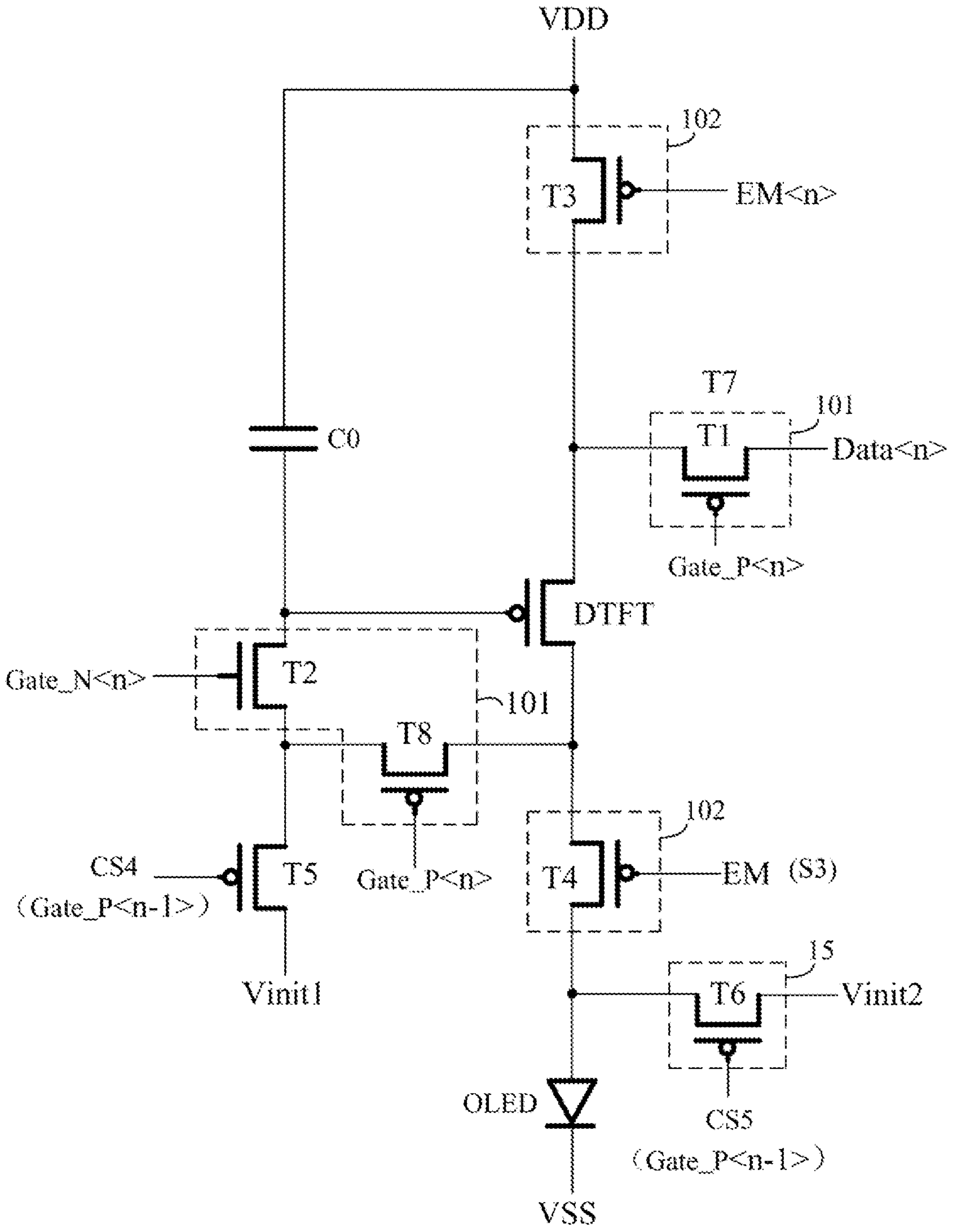
FIG. 14 is a schematic diagram illustrating another circuit structure of a pixel circuit in an embodiment of the present disclosure.

FIG. 14 is a schematic diagram illustrating another circuit structure of a pixel circuit in an embodiment of the present disclosure. As shown in FIG. 14, unlike the previous embodiments, the writing and compensation circuit in the pixel circuit shown in FIG. 14 includes a first transistor T1, a second transistor T2, and an eighth transistor T8.

A control electrode of the first transistor T1 is connected to the first control signal line Gate_P<n>, a first electrode of the first transistor T1 is connected to the data line Data<n>, and a second electrode of the first transistor T1 is connected to the first electrode of the driving transistor.

A control electrode of the second transistor T2 is connected to the second control signal line Gate_N<n>, a first electrode of the second transistor T2 is connected to the gate electrode of the driving transistor, and a second electrode of the second transistor T2 is connected to a first electrode of the eighth transistor T8.

A control electrode of the eighth transistor T8 is connected to the first control signal line Gate_P<n>, and a second electrode of the eighth transistor T8 is connected to the second electrode of the driving transistor.

In some embodiments, the pixel circuit further including a fifth transistor T5.

A control electrode of the fifth transistor T5 is connected to the fourth control signal line CS4, a first electrode of the fifth transistor T5 is connected to the second electrode of the second transistor T2 and the first electrode of the eighth transistor T8, and a second electrode of the fifth transistor T5 is connected to the first reset voltage supply terminal.

In some embodiments, the plurality of pixel circuits are arranged in an array in a row direction and a column direction, and each row of pixel circuits is provided with a corresponding one of the first control signal lines Gate_P<n>. The fourth control signal line CS4 connected to the pixel circuit is the first control signal line Gate_P<n−1> arranged for a previous row of pixel circuits.

Figure 15A:
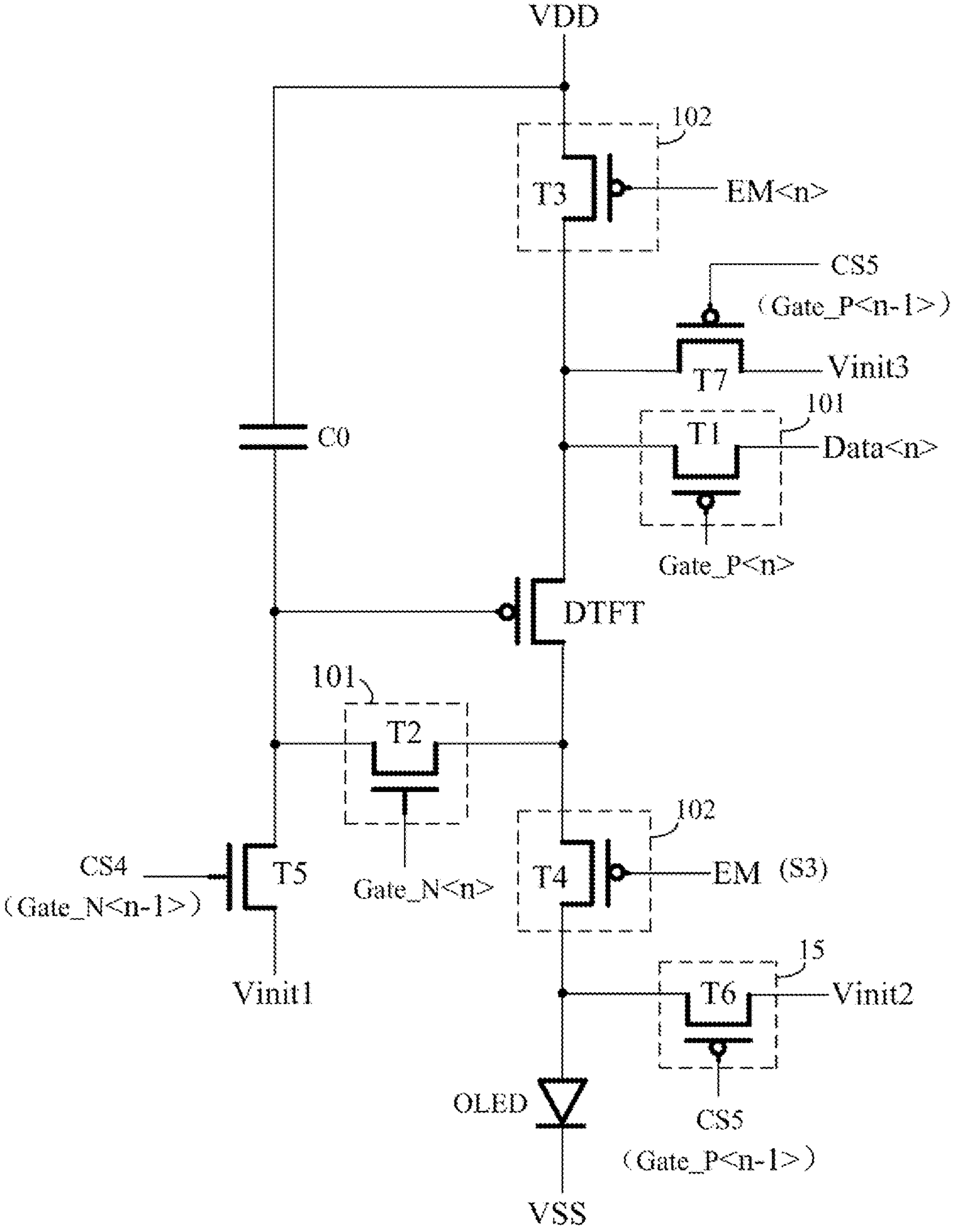
FIGS. 15A to 15C are schematic diagrams illustrating other three circuit structures of pixel circuits in embodiments of the present disclosure.
Figure 15B:
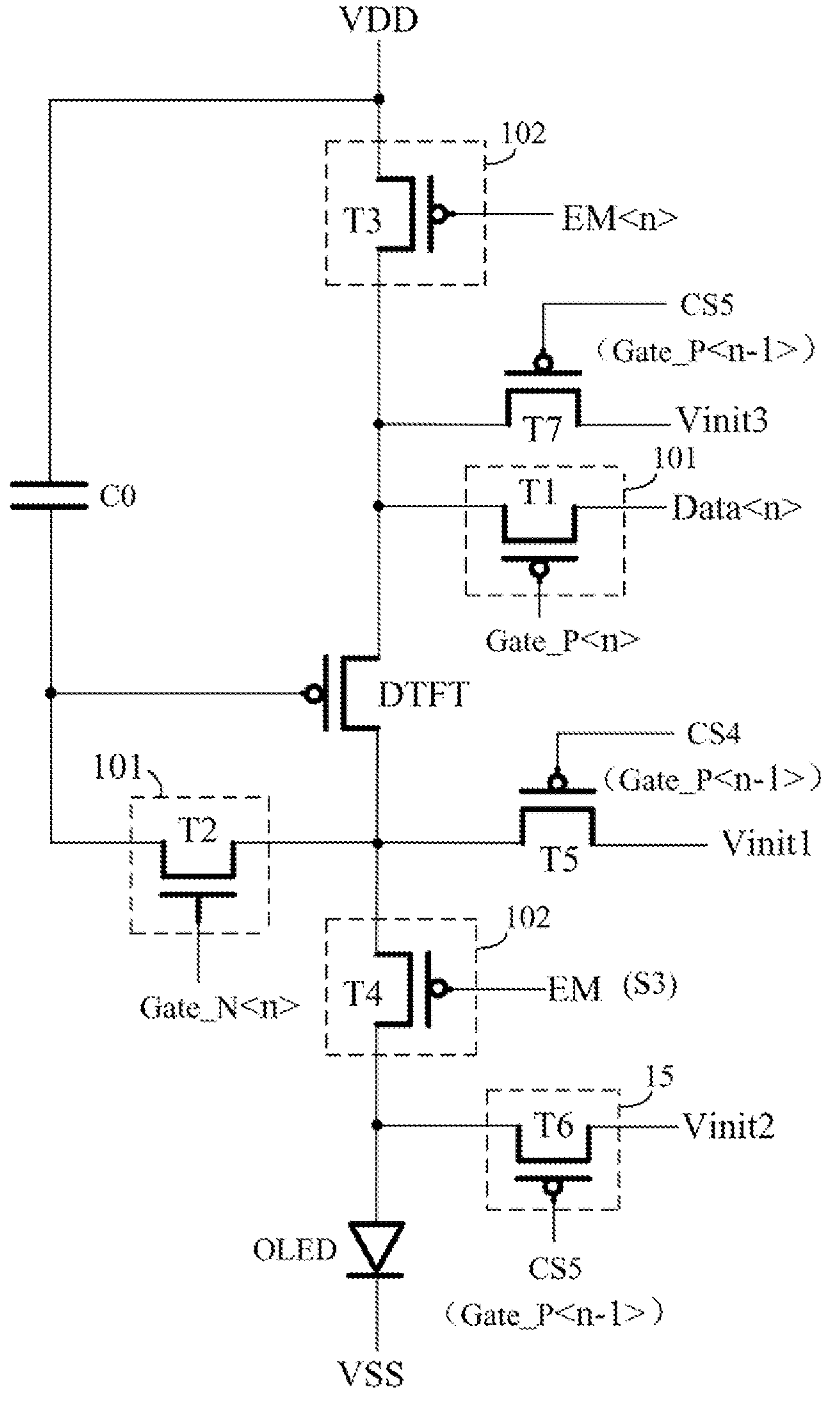
Figure 15C:
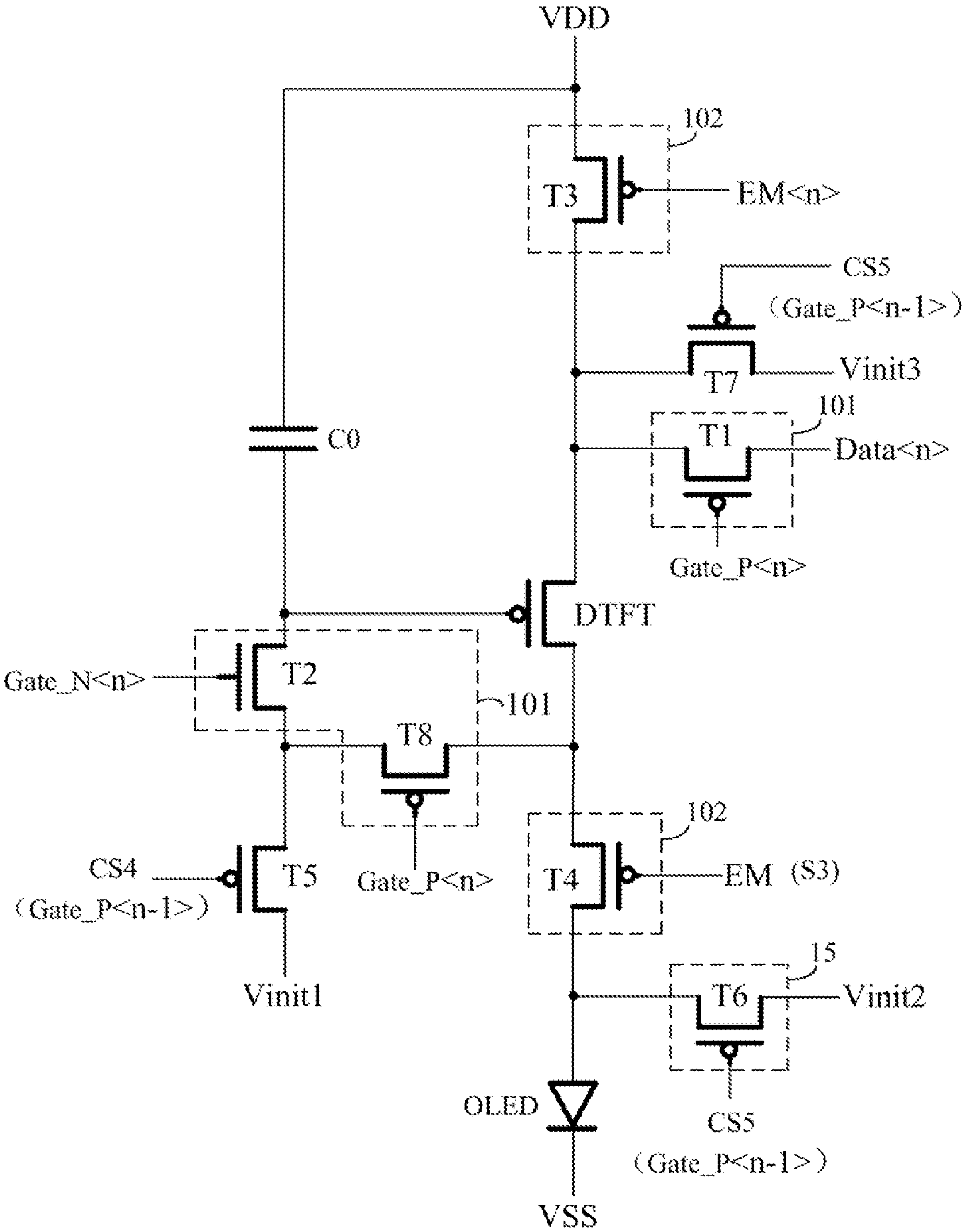

FIGS. 15A to 15C are schematic diagrams illustrating other three circuit structures of pixel circuits in embodiments of the present disclosure. As shown in FIG. 15, unlike the previous embodiments, in the pixel circuits shown in FIGS. 15A to 15C, each of the pixel circuits further includes a seventh transistor T7. A control electrode of the seventh transistor T7 is connected to the fifth control signal line CS5, a first electrode of the seventh transistor T7 is connected to a third reset voltage supply terminal, and a second electrode of the seventh transistor T7 is connected to the first electrode of the driving transistor.

In some embodiments, the plurality of pixel circuits are arranged in an array in a row direction and a column direction, and each row of pixel circuits is provided with a corresponding one of the first control signal lines Gate_P<n>. The fifth control signal line CS5 connected to the pixel circuit is the first control signal line Gate_P<n−1> arranged for a previous row of pixel circuits.

It should be noted that operating timings of the pixel circuits shown in FIGS. 13, 14, and 15A to 15C during the refresh frame and the hold frame may adopt those shown in FIGS. 10 and 11, respectively, and the specific operating process is not repeated herein.

Those skilled in the art will recognize that the pixel circuit in the embodiments of the present disclosure may alternatively adopt other circuit structures, which will not be listed in the present disclosure.

In an embodiment of the present disclosure, the first driving circuit includes a plurality of cascaded first shift registers, the second driving circuit includes a plurality of cascaded second shift registers, and the third driving circuit includes a plurality of cascaded third shift registers.

Figure 16:
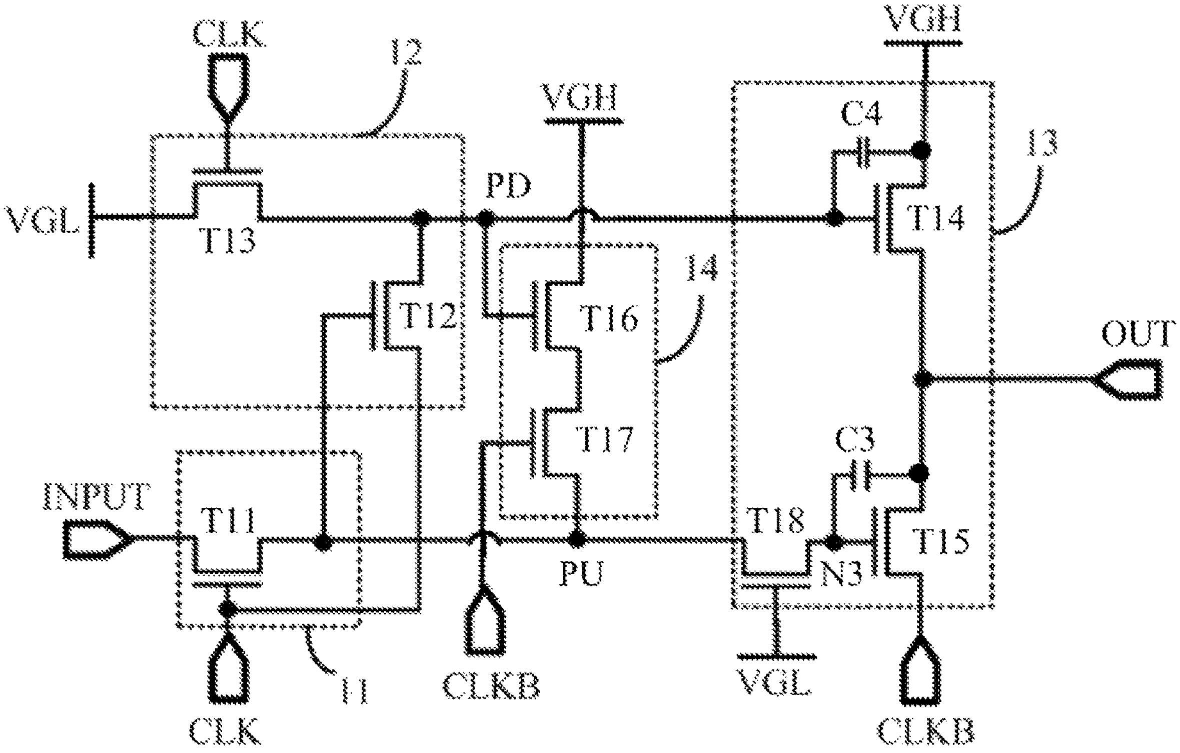
FIG. 16 is a schematic diagram illustrating a circuit structure of a first shift register in an embodiment of the present disclosure.

FIG. 16 is a schematic diagram illustrating a circuit structure of a first shift register in an embodiment of the present disclosure. As shown in FIG. 16, the shift register includes a first input sub-circuit 11, a first pull-down control sub-circuit 12, a first output sub-circuit 13, and a first pull-down sub-circuit 14.

The first input sub-circuit 11 is connected to a signal input terminal INPUT, a pull-up node PU, and a first clock signal terminal CLK, and the first input sub-circuit 11 is configured to write an input signal provided by the signal input terminal INPUT to the pull-up node PU, in response to control by the first clock signal terminal CLK.

The first pull-down control sub-circuit 12 is connected to the first operating voltage terminal V1, the pull-up node PU, a pull-down node PD, and the first clock signal terminal CLK, and the first pull-down control sub-circuit 12 is configured to write a first operating voltage provided by the first operating voltage terminal V1 to the pull-down node PD, in response to control by the first clock signal terminal CLK, and write a first clock signal provided by the first clock signal terminal CLK to the pull-down node PD, in response to control by the voltage at the pull-up node PU.

The first output sub-circuit 13 is connected to a second operating voltage terminal V2, the pull-up node PU, the pull-down node PD, a signal output terminal OUT, and a second clock signal terminal CLKB, and the first output sub-circuit 13 is configured to write a second clock signal provided by the second clock signal terminal CLKB to the signal output terminal OUT, in response to control by a voltage at the pull-up node PU, and write a second operating voltage provided by the second operating voltage terminal V2 to the signal output terminal OUT, in response to control by the pull-down node PD.

The first pull-down sub-circuit 14 is connected to the second operating voltage terminal V2, the pull-up node PU, the pull-down node PD, and the second clock signal terminal CLKB, and the first pull-down sub-circuit 14 is configured to write the second operating voltage to the pull-up node PU, in response to control by a voltage at the pull-down node PD and control by the second clock signal terminal CLKB.

In some embodiments, the first input sub-circuit 11 includes an eleventh transistor T11, the first pull-down control sub-circuit 12 includes a twelfth transistor T12 and a thirteenth transistor T13, the first output sub-circuit 13 includes a fourteenth transistor T14 and a fifteenth transistor T15, and the first pull-down sub-circuit 14 includes a sixteenth transistor T16 and a seventeenth transistor T17.

A control electrode of the eleventh transistor T11 is connected to the first clock signal terminal CLK, a first electrode of the eleventh transistor T11 is connected to the signal input terminal INPUT, and a second electrode of the eleventh transistor T11 is connected to the pull-up node PU.

A control electrode of the twelfth transistor T12 is connected to the pull-up node PU, a first electrode of the twelfth transistor T12 is connected to the first clock signal terminal CLK, and a second electrode of the twelfth transistor T12 is connected to the pull-down node PD.

A control electrode of the thirteenth transistor T13 is connected to the first clock signal terminal CLK, a first electrode of the thirteenth transistor T13 is connected to the first operating voltage terminal V1, and a second electrode of the thirteenth transistor T13 is connected to the pull-down node PD.

A control electrode of the fourteenth transistor T14 is connected to the pull-down node PD, a first electrode of the fourteenth transistor T14 is connected to the second operating voltage terminal V2, and a second electrode of the fourteenth transistor T14 is connected to the signal output terminal OUT.

A control electrode of the fifteenth transistor T15 is connected to the pull-up node PU, a first electrode of the fifteenth transistor T15 is connected to the second clock signal terminal CLKB, and a second electrode of the fifteenth transistor T15 is connected to the signal output terminal OUT.

A control electrode of the sixteenth transistor T16 is connected to the pull-down node PD, a first electrode of the sixteenth transistor T16 is connected to the second operating voltage terminal V2, and a second electrode of the sixteenth transistor T16 is connected to a first electrode of the seventeenth transistor T17.

A control electrode of the seventeenth transistor T17 is connected to the second clock signal terminal CLKB, and a second electrode of the seventeenth transistor T17 is connected to the pull-up node PU.

In some embodiments, the first output sub-circuit further includes an eighteenth transistor T18, a third capacitor C3, and a fourth capacitor C4, and the control electrode of the fifteenth transistor T15 is connected to the pull-up node PU through the eighteenth transistor T18.

A control electrode of the eighteenth transistor T18 is connected to the first operating voltage terminal V1, a first electrode of the eighteenth transistor T18 is connected to the pull-up node PU, and a second electrode of the eighteenth transistor T18 is connected to the control electrode of the fifteenth transistor T15.

A first terminal of the third capacitor C3 is connected to the control electrode of the fifteenth transistor T15, and a second terminal of the third capacitor C3 is connected to the signal output terminal OUT.

A first terminal of the fourth capacitor C4 is connected to the pull-down node PD, and a second terminal of the fourth capacitor C4 is connected to the first electrode of the fourteenth transistor T14.

The operation of the shift register shown in FIG. 16 will be described in detail with reference to the accompanying drawings. It is assumed that the first operating voltage terminal V1 provides a low level operating voltage VGL and the second operating voltage terminal V2 provides a high level operating voltage VGH.

Figure 17:
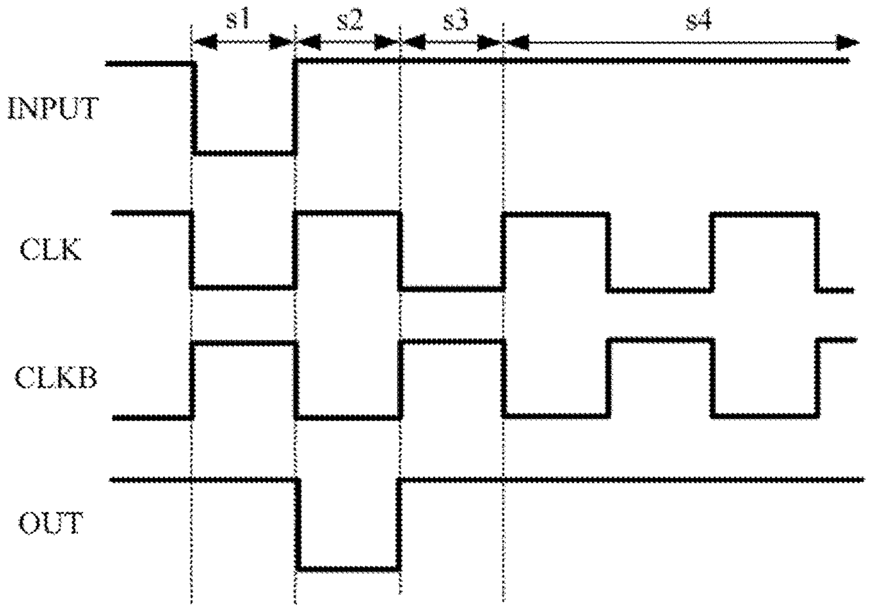
FIG. 17 is a timing diagram illustrating operation of the first shift register shown in FIG. 16.

FIG. 17 is a timing diagram illustrating operation of the first shift register shown in FIG. 16. As shown in FIG. 17, the operation process of the shift register includes a charging phase s1, an output phase s2, a reset phase s3 and a hold phase s4.

During the charging phase s1, the signal input terminal INPUT provides a low level signal, the first clock signal terminal CLK provides a low level signal, and the second clock signal terminal CLKB provides a high level signal. In this case, the eleventh transistor T11, the twelfth transistor T12, the thirteenth transistor T13, the fourteenth transistor T14, the fifteenth transistor T15, the sixteenth transistor T16, and the eighteenth transistor T18 are all turned on, and the seventeenth transistor T17 is turned off, and the pull-up node PU and the pull-down node PD are both in a low level state. The high level operating voltage VGH is written to the signal output terminal OUT through the fourteenth transistor T14, and the second clock signal terminal CLKB provides a high level signal, which is written to the signal output terminal OUT through the fifteenth transistor T15, so that the signal output terminal OUT outputs a high level signal.

During the output phase s2, the signal input terminal INPUT provides a high level signal, the first clock signal terminal CLK provides a high level signal, and the second clock signal terminal CLKB provides a low level signal. In this case, the twelfth transistor T12, the fifteenth transistor T15, and the seventeenth transistor T17 are all turned on, and the eleventh transistor T11, the thirteenth transistor T13, the fourteenth transistor T14, the sixteenth transistor T16, and the eighteenth transistor are all turned off. The pull-up node PU is in a low level state, and the pull-down node PD is in a high level state. The second clock signal terminal CLKB provides a low level signal, which is written to the signal output terminal OUT through the fifteenth transistor T15, so that the signal output terminal OUT outputs a low level signal.

It should be noted that, since the signal provided by the clock signal terminal changes from a high level to a low level, a voltage at a node N3 is pulled down to a lower level, due to the bootstrap action of the third capacitor C3. In this case, for the eighteenth transistor T18, since the voltage VGL at the control electrode thereof is greater than the voltage at the node N3 (i.e., the voltage VGL at the gate electrode at this time is a high level compared to the source electrode voltage), the eighteenth transistor T18 is turned off. Since the eighteenth transistor T18 is turned off, it is possible to prevent the too low voltage at the node N3 from being written to the pull-up node PU, and it is possible to prevent the eleventh transistor T11 and the twelfth transistor T12 from being in a high voltage state, thereby improving the service lives of the eleventh transistor T11 and the twelfth transistor T12.

During the reset phase s3, the signal input terminal INPUT provides a high level signal, the first clock signal terminal CLK provides a low level signal, and the second clock signal terminal CLKB provides a high level signal. In this case, the eleventh transistor T11, the thirteenth transistor T13, the fourteenth transistor T14, the sixteenth transistor T16, the seventeenth transistor T17, and the eighteenth transistor T18 are all turned on, and the twelfth transistor T12 and the fifteenth transistor T15 are both turned off. The pull-up node PU is in a high level state, and the pull-down node PD is in a low level state. The high level operating voltage VGH is written to the signal output terminal OUT through the fourteenth transistor T14.

During the hold phase s4, the signal input terminal INPUT provides a high level signal, the first clock signal terminal CLK provides a clock signal switching between high/low levels, and the second clock signal terminal CLKB provides a clock signal switching between high/low levels. The pull-up node PU is always in a high level state, the pull-down node PD is always in a low level state, the fourteenth transistor T14 maintains turned-on, the fifteenth transistor T15 maintains turned-off, and the signal output terminal OUT maintains to output a high level signal.

In some embodiments, the signal output terminal OUT of the first shift register at an $i^{th}$ stage is connected to the signal input terminal INPUT of the first shift register at the $(i+1)^{th}$ stage, to implement the cascade connection between two shift registers. In this case, the signal input terminal INPUT of the first shift register at the $1^{st}$ stage in the first driving circuit is connected to the timing controller, and the signal input terminal INPUT of the first shift register at the $1^{st}$ stage may be configured to receive the first driving start signal sent by the timing controller.

Figure 18:
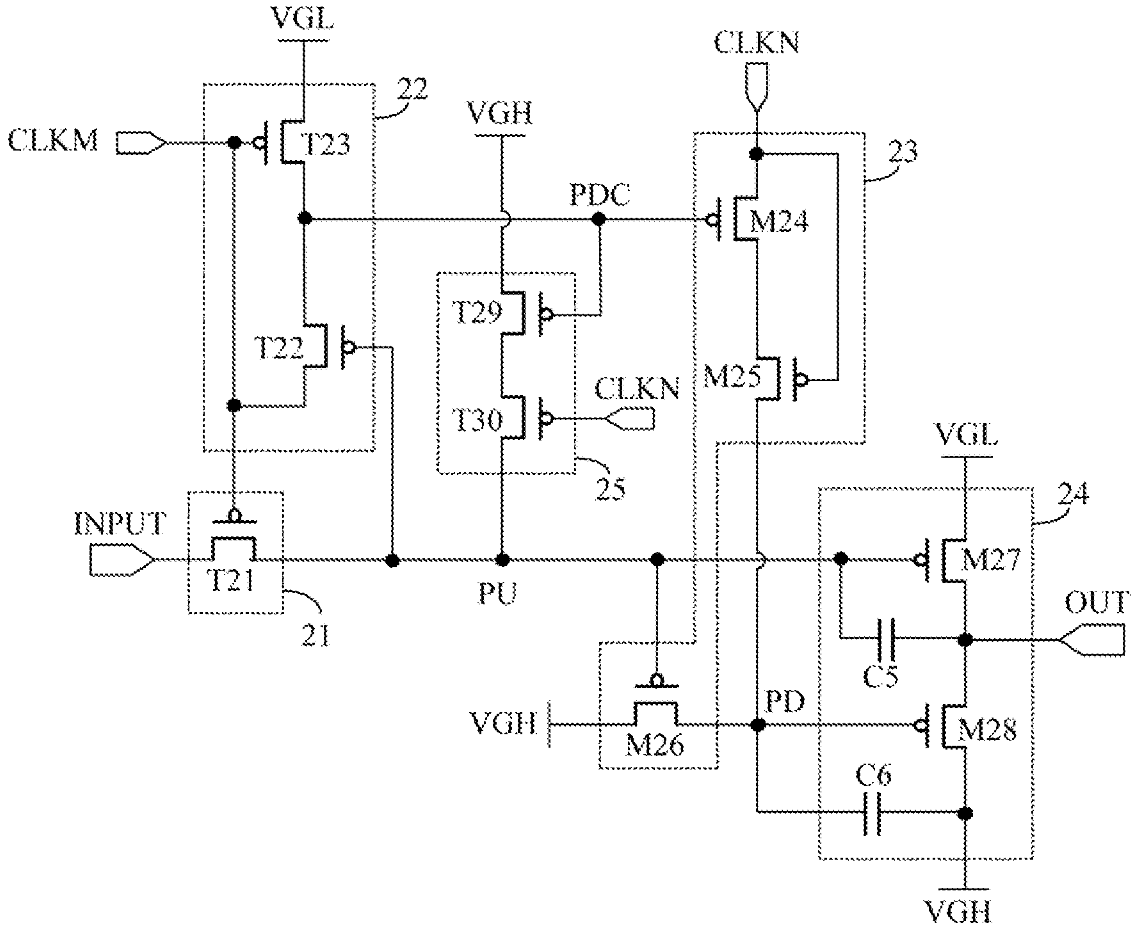
FIG. 18 is a schematic diagram illustrating a circuit structure of a second shift register in an embodiment of the present disclosure.

FIG. 18 is a schematic diagram illustrating a circuit structure of a second shift register in an embodiment of the present disclosure. As shown in FIG. 18, the second shift register includes a second input sub-circuit 21, a voltage control sub-circuit 22, a second pull-down control sub-circuit 23, a second output sub-circuit 24, and a second pull-down sub-circuit 25.

The second input sub-circuit 21 is connected to a signal input terminal INPUT, a pull-up node PU and a third clock signal terminal CLKM, and the second input sub-circuit 21 is configured to write an input signal provided by the signal input terminal INPUT to the pull-up node PU, in response to control by the third clock signal terminal CLKM.

The voltage control sub-circuit 22 is connected to the pull-up node PU, a pull-down control node PDC, and a third clock signal terminal CLKM, and the voltage control sub-circuit 22 is configured to write a third clock signal provided by the third clock signal terminal CLKM to the pull-down control node PDC, in response to control by a voltage at the pull-up node PU, and write a third operating voltage provided by the third operating voltage terminal V3 to the pull-down control node PDC, in response to control by the third clock signal terminal CLKM.

The second pull-down control sub-circuit 23 is connected to a fourth operating voltage terminal V4, the pull-up node PU, the pull-down node PD, the pull-down control node PDC, and a fourth clock signal terminal CLKW, and the second pull-down control sub-circuit 23 is configured to write a fourth clock signal provided by the fourth clock signal terminal CLKW to the pull-down node PD, in response to control by a voltage at the pull-down control node PDC and the fourth clock signal terminal CLKW, and write a fourth operating voltage provided by the fourth operating voltage terminal V4 to the pull-down node PD, in response to control by the voltage at the pull-up node PU.

The second output sub-circuit 24 is connected to a third operating voltage terminal V3, the fourth operating voltage terminal V4, the pull-up node PU, the pull-down node PD, and a signal output terminal, and the second output sub-circuit 24 is configured to write a third operating voltage to the signal output terminal, in response to control by the voltage at the pull-up node PU, and write the fourth operating voltage to the signal output terminal, in response to control by the pull-down node PD.

The second pull-down sub-circuit 25 is connected to the fourth operating voltage terminal V4, the pull-up node PU, the pull-down control node PDC, and the fourth clock signal terminal CLKW, and the second pull-down sub-circuit 25 is configured to write the fourth operating voltage to the pull-up node PU, in response to control by the voltage at the pull-down control node PDC and control by the second clock signal terminal CLKB.

In some embodiments, the second input sub-circuit 21 includes a twenty-first transistor T21, the voltage control sub-circuit 22 includes a twenty-second transistor T22 and a twenty-third transistor T23, the second pull-down control sub-circuit 23 includes a twenty-fourth transistor T24, a twenty-fifth transistor T25 and a twenty-sixth transistor T26, the second output sub-circuit 24 includes a twenty-seventh transistor T27, a twenty-eighth transistor T28, a fifth capacitor C5 and a sixth capacitor C6, and the second pull-down sub-circuit 25 includes a twenty-ninth transistor T29 and a thirtieth transistor T30.

A control electrode of the twenty-first transistor T21 is connected to the third clock signal terminal CLKM, a first electrode of the twenty-first transistor T21 is connected to the signal input terminal INPUT, and a second electrode of the twenty-first transistor T21 is connected to the pull-up node PU.

A control electrode of the twenty-second transistor T22 is connected to the pull-up node PU, a first electrode of the twenty-second transistor T22 is connected to the third clock signal terminal CLKM, and a second electrode of the twenty-second transistor T22 is connected to the pull-down control node PDC.

A control electrode of the twenty-third transistor T23 is connected to the third clock signal terminal CLKM, a first electrode of the twenty-third transistor T23 is connected to the third operating voltage terminal V3, and a second electrode of the twenty-third transistor T23 is connected to the pull-down control node PDC.

A control electrode of the twenty-fourth transistor T24 is connected to the pull-down control node PDC, a first electrode of the twenty-fourth transistor T24 is connected to the fourth clock signal terminal CLKW, and a second electrode of the twenty-fourth transistor T24 is connected to a first electrode of the twenty-fifth transistor T25.

A control electrode of the twenty-fifth transistor T25 is connected to the fourth clock signal terminal CLKW, and a second electrode of the twenty-fifth transistor T25 is connected to the pull-down node PD.

A control electrode of the twenty-sixth transistor T26 is connected to the pull-up node PU, a first electrode of the twenty-sixth transistor T26 is connected to the fourth operating voltage terminal V4, and a second electrode of the twenty-sixth transistor T26 is connected to the pull-down node PD.

A control electrode of the twenty-seventh transistor T27 is connected to the pull-up node PU, a first electrode of the twenty-seventh transistor T27 is connected to the third operating voltage terminal V3, and a first electrode of the twenty-seventh transistor T27 is connected to the signal output terminal.

A control electrode of the twenty-eighth transistor T28 is connected to the pull-down node PD, a first electrode of the twenty-eighth transistor T28 is connected to the fourth operating voltage terminal V4, and a second electrode of the twenty-eighth transistor T28 is connected to the signal output terminal.

A control electrode of the twenty-ninth transistor T29 is connected to the pull-down control node PDC, a first electrode of the twenty-ninth transistor T29 is connected to the fourth operating voltage terminal V4, and a second electrode of the twenty-ninth transistor T29 is connected to a first electrode of the thirtieth transistor T30.

A control electrode of the thirtieth transistor T30 is connected to the fourth clock signal terminal CLKW, and a second electrode of the thirtieth transistor T30 is connected to the pull-up node PU.

A first terminal of the fifth capacitor C5 is connected to the control electrode of the twenty-seventh transistor T27, and a second terminal of the fifth capacitor C5 is connected to the signal output terminal.

A first terminal of the sixth capacitor C6 is connected to the pull-down node PD, and a second terminal of the sixth capacitor C6 is connected to the fourth operating voltage terminal V4.

The operation of the second shift register shown in FIG. 13 will be described in detail with reference to the accompanying drawings. It is assumed that the third operating voltage terminal V3 provides a low level operating voltage VGL and the fourth operating voltage terminal V4 provides a high level operating voltage VGH.

Figure 19:
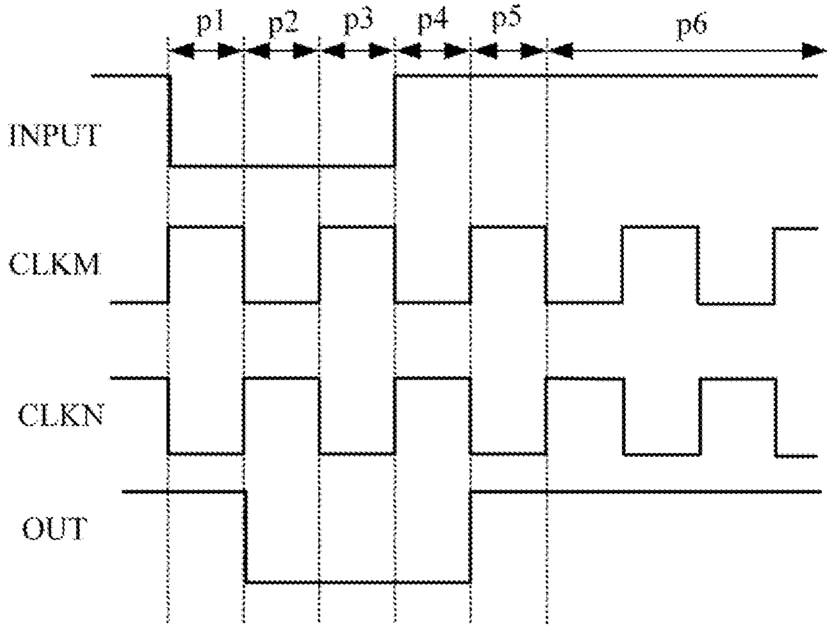
FIG. 19 is a timing diagram illustrating operation of the second shift register shown in FIG. 18.

FIG. 19 is a timing diagram illustrating operation of the second shift register shown in FIG. 18. As shown in FIG. 19, the operation of the shift register includes a charging phase p1, a first output phase p2, a second output phase p3, a third output phase p4, a reset phase p5 and a hold phase p6.

During the charging phase p1, the signal input terminal INPUT provides a low level signal, the third clock signal terminal CLKM provides a high level signal, and the fourth clock signal terminal CLKW provides a low level signal. In this case, the twenty-fourth transistor T24, the twenty-fifth transistor T25, the twenty-eighth transistor T28, the twenty-ninth transistor T29, and the thirtieth transistor T30 are all turned on, and the twenty-first transistor T21, the twenty-second transistor T22, the twenty-third transistor T23, the twenty-sixth transistor T26, and the twenty-seventh transistor T27 are all turned off. The pull-down control node PDC and the pull-down node PD are in a low level state, and the pull-up node PU is in a high level state. The high level operating voltage VGH is written to the signal output terminal OUT through the twenty-eighth transistor T28, so that the signal output terminal OUT outputs a high level signal.

During the first output phase p2, the signal input terminal INPUT provides a low level signal, the third clock signal terminal CLKM provides a low level signal, and the fourth clock signal terminal CLKW provides a high level signal. In this case, the twenty-first transistor T21, the twenty-second transistor T22, the twenty-third transistor T23, the twenty-fourth transistor T24, the twenty-sixth transistor T26, the twenty-seventh transistor T27, and the twenty-ninth transistor T29 are all turned on, and the twenty-fifth transistor T25, the twenty-eighth transistor T28, and the thirtieth transistor T30 are all turned off. The pull-down control node PDC and the pull-up node PU are both in a low level state, and the pull-down node PD is in a high level state. The low level operating voltage VGL is written to the signal output terminal OUT through the twenty-seventh transistor T27, so that the signal output terminal OUT outputs a low level signal.

During the second output phase p3, the signal input terminal INPUT provides a low level signal, the third clock signal terminal CLKM provides a high level signal, and the fourth clock signal terminal CLKW provides a low level signal. In this case, the twenty-second transistor T22, the twenty-fifth transistor T25, the twenty-sixth transistor T26, the twenty-seventh transistor T27, and the thirtieth transistor T30 are all turned on, and the twenty-first transistor T21, the twenty-third transistor T23, the twenty-fourth transistor T24, the twenty-eighth transistor T28, and the twenty-ninth transistor T29 are all turned off. The pull-up node PU is in a low level state, and the pull-down control node PDC and the pull-down node PD are both in a high level state. The low level operating voltage VGL is written to the signal output terminal OUT through the twenty-seventh transistor T27, so that the signal output terminal OUT outputs a low level signal.

During the third output phase p4, the signal input terminal INPUT provides a high level signal, the third clock signal terminal CLKM provides a low level signal, and the fourth clock signal terminal CLKW provides a high level signal. The twenty-first transistor T21, the twenty-third transistor T23, the twenty-fourth transistor T24, and the twenty-ninth transistor T29 are all turned on, and the twenty-second transistor T22, the twenty-fifth transistor T25, the twenty-sixth transistor T26, the twenty-seventh transistor T27, the twenty-eighth transistor T28, and the thirtieth transistor T30 are all turned off. The pull-down control node PDC is in a low level state, and the pull-up node PU and the pull-down node PD are both in a high level state. Since the twenty-seventh transistor T27 and the twenty-eighth transistor T28 are both turned off, the signal output terminal OUT is in a floating state, and the signal output terminal OUT maintains a low level state of the previous phase. That is, the signal output terminal OUT outputs a low level signal.

During the reset phase p5, the signal input terminal INPUT provides a high level signal, the third clock signal terminal CLKM provides a high level signal, and the fourth clock signal terminal CLKW provides a low level signal. In this case, the twenty-fourth transistor T24, the twenty-fifth transistor T25, the twenty-eighth transistor T28, the twenty-ninth transistor T29, and the thirtieth transistor T30 are all turned on, and the twenty-first transistor T21, the twenty-second transistor T22, the twenty-third transistor T23, the twenty-sixth transistor T26, and the twenty-seventh transistor T27 are all turned off. The pull-down control node PDC and the pull-down node PD are both in a low level state, and the pull-up node PU is in a high level state. The high level operating voltage VGH is written to the signal output terminal OUT through the twenty-eighth transistor T28, so that the signal output terminal OUT outputs a high level signal.

During the hold phase p6, the signal input terminal INPUT provides a high level signal, the third clock signal terminal CLKM provides a clock signal switching between high/low levels, and the fourth clock signal terminal CLKW provides a clock signal switching between high/low levels. The pull-up node PU is always in a high level state, the pull-down node PD is always in a low level state, the twenty-eighth transistor T28 maintains turned-on, the twenty-seventh transistor T27 maintains turned-off, and the signal output terminal OUT maintains to output a high level signal.

In some embodiments, the signal output terminal OUT of the second shift register at an $i^{th}$ stage is connected to the signal input terminal INPUT of the second shift register at an $(i+1)^{th}$ stage, to implement the cascade connection between two second shift registers. In this case, the signal input terminal INPUT of the second shift register at the $1^{st}$ stage in the second driving circuit is connected to the timing controller, and the signal input terminal INPUT of the second shift register of the $1^{st}$ stage may be configured to receive the second driving start signal sent by the timing controller.

It should be noted that the circuit structure adopted by the third shift register in the embodiment of the present disclosure may be the same as the circuit structure adopted by the second shift register. For example, the circuit structure shown in FIG. 16 is adopted by the third shift register.

In addition, the specific circuit structures of the shift registers used in the first driving circuit, the second driving circuit and the third driving circuit are only one optional implementation solution in the embodiment of the present disclosure, and do not limit the technical solution of the present disclosure. The specific circuit structures of the first driving circuit, the second driving circuit and the third driving circuit are not limited in the technical solution of the present disclosure.

In some embodiments, the first driving circuit, the second driving circuit and the third driving circuit may be integrated in the display panel as GOA (Gate-driver On Array).

Figure 20:
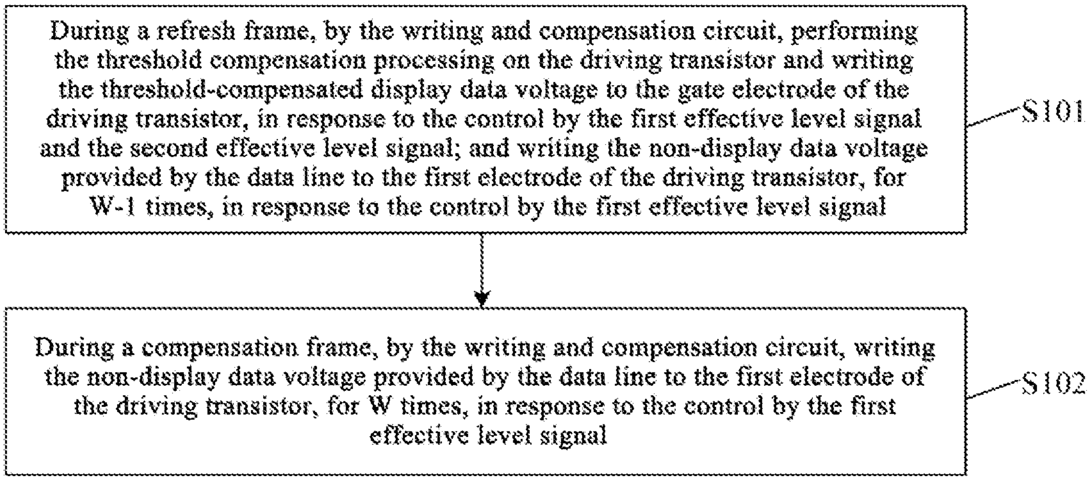
FIG. 20 is a flowchart illustrating a method of driving a pixel circuit provided in an embodiment of the present disclosure.

Based on the same inventive concept, an embodiment of the present disclosure further provides a method of driving a pixel circuit. FIG. 20 is a flowchart illustrating a method of driving a pixel circuit in an embodiment of the present disclosure. As shown in FIG. 9, the pixel circuit includes a driving transistor and a writing and compensation circuit. The writing and compensation circuit is connected to the first electrode of the driving transistor, the second electrode of the driving transistor, and the gate electrode of the driving transistor. The writing and compensation circuit is configured to write a non-display data voltage provided by a data line to the first electrode of the driving transistor, in response to control by a first effective level signal provided by a first control signal line, perform threshold compensation processing on the driving transistor and write a threshold-compensated display data voltage to the gate electrode of the driving transistor, in response to control by the first effective level signal provided by the first control signal line and a second effective level signal provided by a second control signal line. For the detailed description of the pixel circuit, reference may be made to the contents in the foregoing embodiments, and details are not repeated herein.

The method of driving the pixel circuit includes step S101.

Step S101, during a refresh frame, by the writing and compensation circuit, performing the threshold compensation processing on the driving transistor and writing the threshold-compensated display data voltage to the gate electrode of the driving transistor, in response to the control by the first effective level signal and the second effective level signal; and writing the non-display data voltage provided by the data line to the first electrode of the driving transistor, for W−1 times, in response to the control by the first effective level signal.

W≥2 and W is an integer.

The difference in hysteresis effect among different pixel circuits can be effectively improved through the step S101.

In some embodiments, the pixel driving method further includes the step S102.

Step S102, during a hold frame, by the writing and compensation circuit, writing the non-display data voltage provided by the data line to the first electrode of the driving transistor, for W times, in response to the control by the first effective level signal.

For the specific description of the steps S101 and S102, reference may be made to the contents in the foregoing embodiments, and details are not repeated herein.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and essence of the present disclosure, and these changes and modifications are to be considered within the scope of the present disclosure.

What is claimed is:

1. A timing controller applied to a display device, wherein the display device comprises a plurality of pixel circuits, a first driving circuit, and a second driving circuit, and each of the plurality of pixel circuits comprises a driving transistor and a writing and compensation circuit;

the writing and compensation circuit is connected to a first electrode, a second electrode and a gate electrode of the driving transistor, and is configured to write a non-display data voltage provided by a data line to the first electrode of the driving transistor, in response to control by a first effective level signal provided by a first control signal line, perform threshold compensation processing on the driving transistor and write a threshold-compensated display data voltage to the gate electrode of the driving transistor, in response to the control by the first effective level signal provided by the first control signal line and a second effective level signal provided by a second control signal line;

the first driving circuit is connected to first control signal lines for the plurality of pixel circuits, and is configured to sequentially output the first effective level signal to each of the first control signal lines, according to a first driving start signal;

the second driving circuit is connected to second control signal lines for the plurality of pixel circuits, and is configured to sequentially output the second effective level signal to each of the second control signal lines, according to a second driving start signal; and the timing controller is connected to the first driving circuit and the second driving circuit, and is configured to provide the first driving start signal to the first driving circuit and provide the second driving start signal to the second driving circuit during a refresh frame in a display period, a number of effective pulses in the first driving start signal is W, where W≥2, and W is an integer, wherein during the refresh frame, a time segment corresponding to at least one of the effective pulses in the first driving start signal is within a time segment corresponding to an effective pulse in the second driving start signal, and a time segment corresponding to at least one of the effective pulses in the first driving start signal is outside the time segment corresponding to the effective pulse in the second driving start signal.

2. The timing controller according to claim 1, wherein the timing controller is specifically configured to provide the first driving start signal to the first driving circuit in each fixed frame in the display period, wherein the number of effective pulses in the first driving start signal in each fixed frame is W.

3. The timing controller according to claim 1, wherein the display period further comprises at least one hold frame subsequent to the refresh frame; and during each of the at least one hold frame, the timing controller does not provide the second driving start signal to the second driving circuit.

4. The timing controller according to claim 1, wherein the second driving start signal comprises one effective pulse during the refresh frame, a time segment corresponding to a $1^{st}$ effective pulse in the first driving start signal is within the time segment corresponding to the effective pulse in the second driving start signal, and a time segment corresponding to other effective pulse except for the $1^{st}$ effective pulse in the first driving start signal is outside the time segment corresponding to the effective pulse in the second driving start signal.

5. The timing controller according to claim 4, wherein a ratio of an effective pulse width of the effective pulse in the second driving start signal to an effective pulse width of the $1^{st}$ effective pulse in the first driving start signal is in a range of 3:1 to 14:1.

6. The timing controller according to claim 1, wherein the display device further comprises a third driving circuit;

the pixel circuit further comprises a light emitting control circuit and a light emitting element;

the light emitting control circuit is connected to a first operating voltage supply terminal, the first electrode of the driving transistor, the second electrode of the driving transistor, and a first terminal of the light emitting element, and is configured to form a conductive path between the first operating voltage supply terminal and the first electrode of the driving transistor and form a conductive path between the second electrode of the driving transistor and the light emitting element, in response to control by a third effective level signal provided by a third control signal line;

a second terminal of the light emitting element is connected to a second operating voltage supply terminal;

the third driving circuit is connected to third control signal lines for the plurality of pixel circuits, and is configured to sequentially output the third effective level signal to each of the third control signal lines, according to a third driving start signal; and the timing controller is further configured to provide the third driving start signal to the third driving circuit in each fixed frame in the display period.

7. The timing controller according to claim 6, wherein the third driving start signal comprises at least one effective pulse; and a time segment corresponding to each of the effective pulses in the first driving start signal does not overlap a time segment corresponding to each of the at least one effective pulse in the third driving start signal.

8. The timing controller according to claim 7, wherein during the refresh frame, the second driving start signal comprises one effective pulse, and a time segment corresponding to other effective pulse except for a $1^{st}$ effective pulse in the first driving start signal is subsequent to the time segment corresponding to the effective pulse in the second driving start signal, and prior to a time segment corresponding to a $1^{st}$ effective pulse in the third driving start signal.

9. The timing controller according to claim 7, wherein the display period further comprises at least one hold frame subsequent to the refresh frame; and during each of the at least one hold frame, the time segment corresponding to each of the effective pulses in the first driving start signal is prior to a time segment corresponding to a 1st effective pulse in the third driving start signal.

10. The timing controller according to claim 1, wherein $2 \leq W \leq 6$.

11. The timing controller according to claim 1, wherein effective pulse widths of the effective pulses in the first driving start signal are equal to each other.

12. The timing controller according to claim 1, wherein a sum of effective pulse widths of all the effective pulses in the first driving start signal is equal, throughout respective fixed frames in the display period.

13. The timing controller according to claim 1, wherein a waveform of the first driving start signal is the same, throughout respective fixed frames in the display period.

14. The timing controller according to claim 11, wherein each of the effective pulses in the first driving start signal is a low level pulse; and the effective pulse in the second driving start signal is a high level pulse.

15. A display device, comprising the timing controller according to claim 1.

16. The display device according to claim 15, wherein the display device further comprises a display panel comprising a plurality of pixel circuits, and each of the plurality of pixel circuits comprises a driving transistor, a writing and compensation circuit, a light emitting control circuit, and a light emitting element;

the writing and compensation circuit is connected to a first electrode, a second electrode and a gate electrode of the driving transistor, and is configured to write the non-display data voltage provided by a data line to the first electrode of the driving transistor, in response to control by a first effective level signal provided by a first control signal line, and perform threshold compensation processing on the driving transistor and write a threshold-compensated display data voltage to the gate electrode of the driving transistor, in response to control by the first effective level signal provided by the first control signal line and a second effective level signal provided by a second control signal line;

the light emitting control circuit is connected to a first operating voltage supply terminal, the first electrode of the driving transistor, the second electrode of the driving transistor, and a first terminal of the light emitting element, and is configured to form a conductive path between the first operating voltage supply terminal and the first electrode of the driving transistor and form a conductive path between the second electrode of the driving transistor and the light emitting element, in response to control by a third effective level signal provided by a third control signal line; and a second terminal of the light emitting element is connected to a second operating voltage supply terminal.

17. The display device according to claim 16, wherein the writing and compensation circuit comprises a first transistor and a second transistor;

a control electrode of the first transistor is connected to the first control signal line, a first electrode of the first transistor is connected to the data line, and a second electrode of the first transistor is connected to the first electrode of the driving transistor; and a control electrode of the second transistor is connected to the second control signal line, a first electrode of the second transistor is connected to the gate electrode of the driving transistor, and a second electrode of the second transistor is connected to the second electrode of the driving transistor.

18. A pixel driving method applied to a pixel circuit, wherein the pixel circuit comprises a driving transistor and a writing and compensation circuit;

the writing and compensation circuit is connected to a first electrode, a second electrode and a gate electrode of the driving transistor, and is configured to write a non-display data voltage provided by a data line to the first electrode of the driving transistor, in response to control by a first effective level signal provided by a first control signal line, and perform threshold compensation processing on the driving transistor and write a threshold-compensated display data voltage to the gate electrode of the driving transistor, in response to control by the first effective level signal provided by the first control signal line and a second effective level signal provided by a second control signal line;

the driving method comprises:

during a refresh frame, by the writing and compensation circuit, performing the threshold compensation processing on the driving transistor and writing the threshold-compensated display data voltage to the gate electrode of the driving transistor, in response to the control by the first effective level signal and the second effective level signal; and writing the non-display data voltage provided by the data line to the first electrode of the driving transistor, for $W-1$ times, in response to the control by the first effective level signal;

wherein $W \geq 2$ and W is an integer, wherein during the refresh frame, a time segment corresponding to at least one first effective level signal is within a time segment corresponding to the second effective level signal, and a time segment corresponding to at least another one first effective level signal is outside the time segment corresponding to the second effective level signal.

19. The pixel driving method according to claim 18, further comprising:

during a hold frame, the writing and compensation circuit, writing the non-display data voltage provided by the data line to the first electrode of the driving transistor, for W times, in response to the control by the first effective level signal.

* * * * *